US010395216B2

(12) United States Patent (10) Patent No.: US 10,395,216 B2
Coffing (45) Date of Patent: Aug. 27, 2019

(54) COMPUTER-BASED METHOD AND SYSTEM OF ANALYZING, EDITING AND IMPROVING CONTENT

(71) Applicant: Dan Coffing, Fairfax, VA (US)

(72) Inventor: Dan Coffing, Fairfax, VA (US)

( * ) Notice: Subject to any disclaimer, the term of this patent is extended or adjusted under 35 U.S.C. 154(b) by 703 days.

(21) Appl. No.: 14/897,253

(22) PCT Filed: Mar. 18, 2014

(86) PCT No.: PCT/US2014/031031
§ 371 (c)(1),
(2) Date: Dec. 10, 2015

(87) PCT Pub. No.: WO2014/146086
PCT Pub. Date: Sep. 18, 2014

(65) Prior Publication Data
US 2016/0148159 A1  May 26, 2016

Related U.S. Application Data

(60) Provisional application No. 61/802,300, filed on Mar. 15, 2013.

(51) Int. Cl.
*G06Q 10/10* (2012.01)
*G06Q 50/18* (2012.01)

(52) U.S. Cl.
CPC ........... *G06Q 10/103* (2013.01); *G06Q 10/10* (2013.01); *G06Q 50/182* (2013.01)

(58) Field of Classification Search
CPC .......................... G06F 17/2247; G06F 17/2705
USPC ......................................................... 707/755
See application file for complete search history.

(56) References Cited

U.S. PATENT DOCUMENTS

| 2003/0084425 | A1* | 5/2003 | Glaser .................... G06F 8/433 717/110 |
| 2009/0117883 | A1* | 5/2009 | Coffing ................... H04W 4/21 455/414.1 |
| 2013/0179386 | A1* | 7/2013 | Schindler ................. G06N 5/02 706/46 |

FOREIGN PATENT DOCUMENTS

WO   WO 2014/146086    9/2014

OTHER PUBLICATIONS

Adam Wyner, Multi-modal Multi-threaded Online Forums, 2009, Google, 9 pages.*
Katzav et al.; "A Classification System for Arguments", 2012 [retrieved on Aug. 6, 2014] Retrieved from the internet <URL: http://www.arg.dundee.ac.uk/people/chris/publications/2004/ClassifyingArguments.pdf>. Entire document.
Pinto; "The Account of Warrants in Bermejo-Luque's Giving Reasons." 2011. [retrieved on Aug. 6, 2014]. Retrieved from the Internet:<URL: http://www.ehu.es/ojs/index.php/THEORIA/article/viewFile/2950/2634>. Entire document.

(Continued)

Primary Examiner — Jean B Fleurantin
(74) Attorney, Agent, or Firm — Polsinelli LLP

(57) ABSTRACT

A method for providing proposition-based content for review within a collaborative environment includes representing a set of propositional content available for an argument within a user interface provided via one or more client systems as a plurality of statement elements that are each one of a plurality of statement types that include premise, warrant, and claim, constructing a logical argument object for the argument based on input defining the argument to include one or more premises.

30 Claims, 9 Drawing Sheets

(56) References Cited

OTHER PUBLICATIONS

Simosi, Maria; Using Toulmin's Framework for the Analysis of Everyday Argumentation: Some Methodological Considerations. 2003. [retrieved on Aug. 6, 2014] Retrieved from the Internet:<URL:http://www.syros.aegean.gr/users/simosi/simosi_webpage_files/toulmin.pdf>. entire document.
Trzesicki, Kazimierz; Arguemnts and their Classification. 2011. [retrieved on Aug. 6, 2014]. Retrieved from the Internet<URL:http://logika.uwb.edu/pl/studies/download/php?volid=36&artid=kt>. Entire document.
PCT Application No. PCT/US2014/031031 International Search Report and Written Opinion dated Aug. 25, 2014.

\* cited by examiner

COMPUTER-BASED METHOD AND SYSTEM OF ANALYZING, EDITING AND IMPROVING CONTENT

RELATED APPLICATIONS

The presently disclosed application claims priority from U.S. Provisional Application Ser. No. 61/802,300, filed Mar. 15, 2013, the entire disclosure of which is incorporated herein by reference.

BACKGROUND

Exemplary embodiments of the present invention generally relate to modeling and analyzing proposition-based content to identify one or more areas for improvement and/or clarification. More particularly, exemplary embodiments relate to presenting and reviewing proposition-based content within a distributed computing system using a collaborative environment.

Human persuasion is single-threaded, discordant, and often reliant on factors other than logical consequence. The techniques of rhetoric employed in the pursuit of real-time persuasion rely on human memory to be short-term, finite, singularly focused, distractible and subject to emotional effects. Politicians, lawyers, professors, commentators, salespeople, tyrants, and others rely on their listeners to possess these familiar limitations—for better or for worse, all part of the reality of human persuasion.

Another governing principle in persuasion is that humans are remarkably social. Not only do they try to persuade each other, but they also critique and criticize. Individuals willingly submit their assertion to public review, hoping and expecting that their expressive statements will improve by critique, and thus carry more persuasive weight. In essence, the public forum of debate has a purifying or perfecting effect on the speaker's positions, in a manner akin to peer review in the research literature; no one wins any points until their arguments have been tested, and the more thorough the scrutiny the more likely that the emergent conclusion is true.

The limitations of human mental capacity deserve special mention in discussing the "persuasion problem." The problem arises when decisions follow faulty conclusions. Not only does finite awareness allow a speaker to say different— even contradictory—things to different audiences, it also allows self-contradiction within a single speech, as long as the contradictory statements are sufficiently far apart. Furthermore, the numerous factual misstatements and logical non-sequiturs that punctuate public rhetoric weaken conclusions and consequent decisions. In addition, the development of a conclusion by which a disputed point becomes "settled" is often quite uneven. Far too often, the speaker with the largest proverbial megaphone will prevail.

The media industry, for example, tends to cater to a specific targeted clientele, effectively ensuring that neither side of a debate hears much of what it doesn't enjoy, and neither side is trained to hone its arguments as counterpoints to the opposition. Instead, each side perfects its untested positions and self-assurances in the fawning attention of friendly listeners. Alas, when polar opinions eventually do clash, neither side can believe or tolerate the rhetoric of the other. This represents a serious loss to the quality of public discourse and is ultimately a grave threat to a free and civil society.

SUMMARY OF INVENTION

Exemplary embodiments of the present invention are related to a method for providing proposition-based content for review within a collaborative environment. The method includes representing a set of propositional content available for a first argument as a plurality of statement elements within a user interface provided to one or more users via one or more client systems. Each of the statement elements has a respective associated state and is one of a plurality of statement types that include premise, warrant, and claim. The method further includes constructing a logical argument object for the first argument based on a first set of input defining the first argument according to a specified argument type to include one or more premises and one or more warrants of the statement elements, a first claim of the statement elements, and a plurality of interconnections defining logical relations between the one or more premises, the one or more warrants, and the first claim according to respective logical rules for the one or more warrants such that the respective associated state of the first claim is dependent upon the respective associated states of the one or more premises and the one or more warrants and the logical relations defined by the interconnections of the first argument. The method further includes automatically analyzing the logical argument object for the first argument to determine the respective associated state of the first claim based on the respective associated states of the one or more premises and the one or more warrants and the logical relations defined by the interconnections in the first argument and generating a structured argument model representation of the logical argument object for the first argument within the user interface that includes an indication of each of the one or more premises, the one or more warrants, the first claim, the interconnections between the one or more premises, the one or more warrants, and the first claim, and the respective associated state of each of the one or more premises, the one or more warrants, and the first claim.

Exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1A:
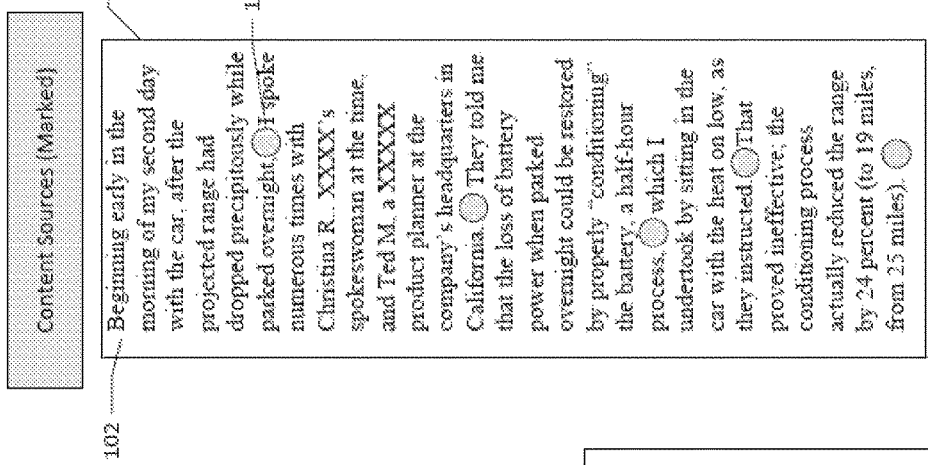
FIGS. 1a-1b illustrate an example of proposition-based content being presented for review within an annotated content layer view and constructed into a structured argument representation within an argument model layer view provided by a graphical user interface implemented in accordance with an exemplary embodiment of the present invention.

The detailed description explains exemplary embodiments of the present invention, together with advantages and features, by way of example with reference to the drawings, in which similar numbers refer to similar parts throughout the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered to be within the scope of the claimed invention.

DETAILED DESCRIPTION

While the specification concludes with claims defining the features of the invention that are regarded as novel, it is believed that the invention will be better understood from a consideration of the description of exemplary embodiments in conjunction with drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form, and it will be apparent to those skilled in the art that the present invention may be practiced without these specific details. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Exemplary embodiments of the present invention can be implemented to provide a collaborative environment within a distributed computer system for submitting, processing, presenting, and analyzing proposition-based content in such a way that effectiveness of an argument formed from a chain of statements can be measured, challenged and honed by interacting with users, logic tools, and other available propositional content. The phrase Digital Arbitration (or Darbitrage) may be used to refer to processes that may be implemented by exemplary embodiments of the present invention individually or in combination with one another. Several publications are referenced in the following description. The cited references describe various technologies that may be implemented and/or utilized within exemplary embodiments of the present invention and are hereby incorporated by reference.

Exemplary embodiments of the present invention can implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, Java, etc. As used herein, the terms "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 6 and described below) or they can be implemented and run on different computing systems. For example, one or more modules can be implemented on a personal computer operated by a user while other modules can be implemented on a remote server and accessed via a network.

Figure 7:
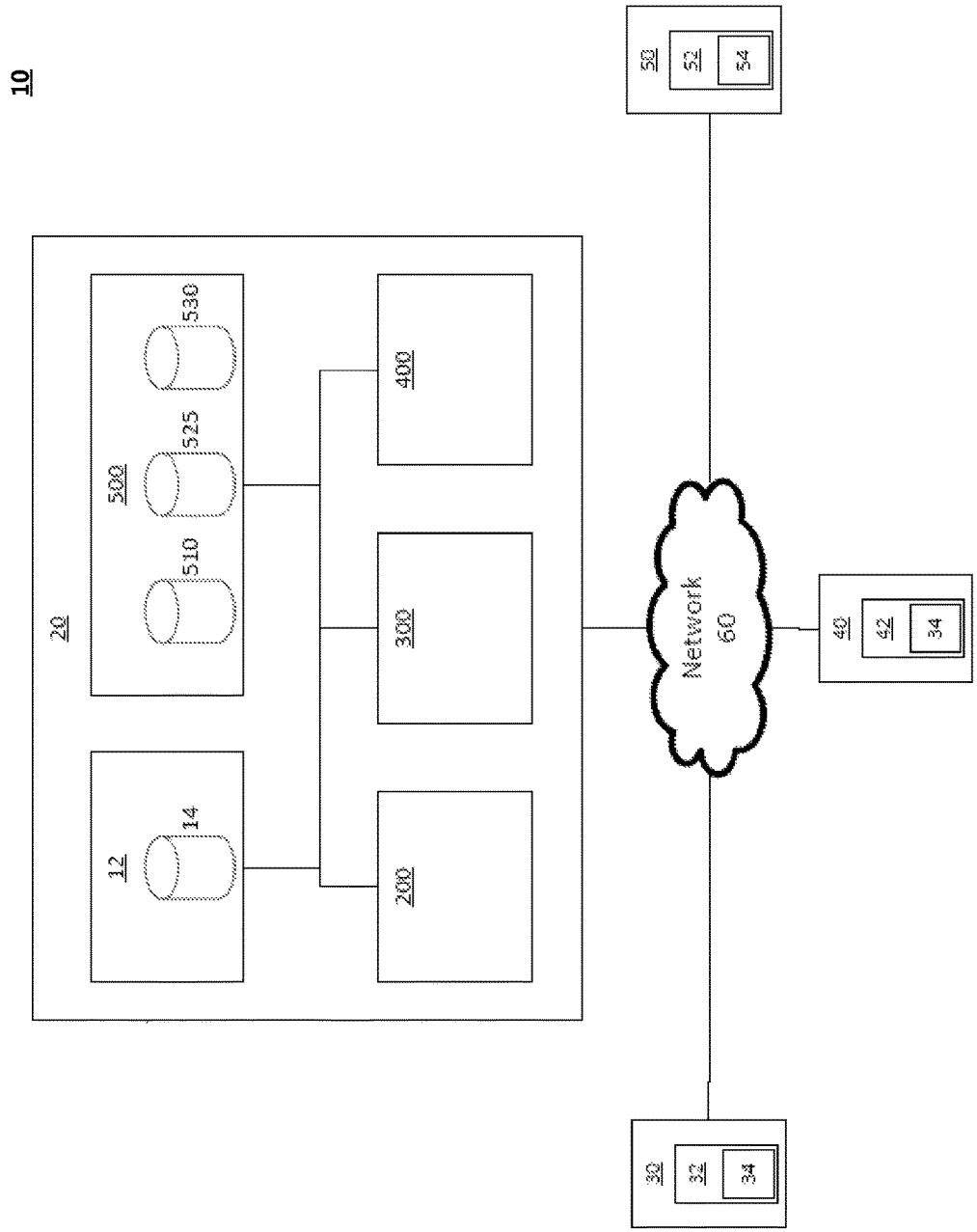
FIG. 7 is a schematic diagram illustrating an exemplary embodiment of a distributed processing system for providing proposition-based for review in accordance with an exemplary embodiment of the present invention.

Referring now to FIG. 7, a schematic diagram illustrating an exemplary embodiment of a distributed Darbitrage system 10 within which multiple computing devices are utilized along with one or more data networks in accordance with the present invention are provided to form a collaborative environment. In the exemplary embodiment illustrated in FIG. 7, Darbitrage system 10 generally includes a Darbitrage service computer platform 20, such as a server, that includes an ontological information base 12, an argument presenter 200, an interaction component 300, an argument arbiter 400, and a knowledge base 500, and client computer systems 30, 40, and 50, which are communicatively coupled to platform 20 via a network 60. Darbitrage system 10 can be implemented using standard or any suitable network and security protocols. Users of the system may thereby access the various functionalities provided by Darbitrage service platform 20 over network 60 using corresponding client applications 32, 52 implemented on client systems 30, 40, and 50. Users may utilize the client systems to interact with Darbitrage service platform 20 using, for example, commands, keystrokes, or mouse clicks.

More particularly, in exemplary system 10, client application 32 implements a common user interface 34 and client application 52 implements an arbiter user interface component 54 via which users of client applications 32, 42, 52 may be configured may access Darbitrage service platform 20. As will be explained in greater detail below, user interfaces 34 and 54 are implemented to provide access to different sets of the functionalities provided by the components of the Darbitrage service platform via network 60 according to the respective rights or roles of the users of client systems 30, 40, and 50 within system 10. In the exemplary embodiment illustrated in FIG. 7, for example, client application 32 is a common user client configured to provide access to Darbitrage service platform 20 via common user interface 34 for users having common rights within system 10, while client application 52 is an arbiter user client configured to provide access to Darbitrage service platform 20 via arbiter user interface 54 on behalf of users that have been assigned an arbiter role within system 10. Of course, in exemplary embodiments, particular client applications may be provided that implement user interfaces for providing access to different sets of functionalities than those provided by common user interface 34 and arbiter user interface 54 such as, for example, a universal client that is configured to access the set of all functionalities of Darbitrage service platform 20 that both common user interface 34 and arbiter user interface 54 are able to access.

For example, Darbitrage platform 20 can be configured to provide a web application for respective client applications implemented on client systems 30, 40, 50 that provide web-based user interfaces for utilizing the services provided by Darbitrage platform. For instance, the user interfaces of client applications implemented on client systems 30, 40, 50 can be configured to provide various options corresponding to the functionality offered in exemplary embodiments described herein through suitable user interface controls (for example, by way of menu selection, point-and-click, dialog box, or keyboard command). In one general example, the user interfaces may provide "send" or "submit" buttons that allow users of client applications to transmit requested information to Darbitrage platform 20. The user interfaces can provide, for example, a common display structure that is rendered in a web browser as a web page representing services provided by Darbitrage platform 20 to a user of a client system.

In exemplary embodiments, the client applications utilized in exemplary embodiments of the present invention can be configured for incorporation within any suitable network computing environment as a plug-in, add-on, or extension. As used herein, the term "plug-in" can refer to a software application or module program, or one or more computer instructions, which may or may not be in communication with other software applications or modules, that interacts with a host application to provide specified functionality, and which may include any file, image, graphic, icon, audio, video, or any other attachment. In other exemplary embodiments, the client applications can be implemented as a standalone program, a portable application, a native component of an automated software testing tool, a part of a software bundle, or any other suitable implementation.

According to the client-server model of computer process interaction utilized in exemplary embodiments of the present invention described herein, a client process sends a message including a request to a server process, and the server process responds by providing a service. The server process may also return a message with a response to the client process. Often the client process and server process execute on different computer devices, called hosts, and communicate via a network using one or more protocols for network communications.

As used herein, the term "client" refers to the process that makes the request, or the host computer device on which the process operates. In exemplary embodiments described herein, computer systems 30-50 are user terminals or other client systems or devices implementing software for and running a respective client application for accessing services provided by Darbitrage service platform 20. Such client applications may also be referred to as client modules, or simply clients, and may be implemented in a variety of ways. In exemplary embodiments, such client applications can be implemented as any of a myriad of suitable client application types, which range from proprietary client applications (thick clients) to web-based interfaces in which the user agent function is provided by a web server and/or a back-end program (for example, a CGI program).

Similarly, as used herein, the term "server" refers to the process that provides the service, or the host computer device on which the process operates. In addition, a process executing as a server can be broken up to run as multiple servers on multiple hosts (sometimes called tiers) for reasons that include reliability, scalability, and redundancy, but not limited to those reasons. As used herein, the terms "service," "service task," or the like can refer to any discrete, repeatable process used to encapsulate a functional unit of an application by providing an interface that is well-defined and implementation independent. The process can be an individual function or a collection of functions that together form a process. A service can be invoked (or consumed) by other services or client applications. A service, such as a web service, may be implemented as a software application that may be called by another application to provide a service over a network, such as the Internet. A service represents a self-contained, self-describing piece of application functionality that can be found and called by other applications. A service may be self-contained because the application calling the service does not need to depend on anything other than the service itself, and may be self-describing because all the information on how to use the service can be obtained from the service itself. To interact with a service, a client system may make a call, such as a Simple Object Access Protocol (SOAP) call, to the service. The call may include sending a message, such as a SOAP message formatted in accordance with a WSDL (Web Services Definition Language) document describing the service.

It should of course be understood that FIG. 7 is intended as an example, not as an architectural limitation for different embodiments of the present invention, and therefore, the particular elements depicted in FIG. 7 should not be considered limiting with regard to the environments within which exemplary embodiments of the present invention may be implemented. For example, while three client systems are shown in FIG. 7, any number of one or more client systems may be included within system 10. Moreover, while the exemplary embodiment illustrated in FIG. 7 depicts Darbitrage service platform 20 as an individual physical device, the applications provided thereby and data storage capabilities provided thereby, or various combinations of these applications, may actually be server applications running on separate physical devices or separate service platforms. In exemplary embodiments, partials sets of the applications and data storage capabilities described in exemplary embodiments provided herein as being provided by Darbitrage service platform 20 may alternatively be implemented by applications running on one or more client systems connected to Darbitrage service platform 20.

The computer systems of exemplary system 10 can be any of a wide range of suitable computing devices such as one or more workstations, desktop computers, laptops, or other personal computers (PCs) (for example, IBM or compatible PC workstations running the MICROSOFT WINDOWS operating system or LINUX OS, MACINTOSH computers running the MAC OSX operating system, or equivalent), non-traditional-computer digital devices such as Personal Digital Assistants (PDAs) and other handheld or portable electronic devices, smart phones, tablet PCs, game consoles, home theater PCs, desktop replacement computers, and the like, or any other suitable information processing devices. In exemplary embodiments, computer platform 20 may be a server system (for example, SUN ULTRA workstations running the SUN operating system, IBM RS/6000 workstations and servers running the AIX operating system, or an IBM zSeries eServer running z/OS, z/VM or LINUX OS). An exemplary computer system that may be implemented within system 10 is described in greater detail below with reference to FIG. 6.

Network 60 can facilitate communications between computer systems 30-50 and Darbitrage service platform 20 by any suitable wired (including optical fiber), wireless technology, or any suitable combination thereof, including, but not limited to, personal area networks (PANs), local area networks (LANs), wireless networks, wide-area networks (WAN), the Internet (a network of heterogeneous networks using the Internet Protocol, IP), and virtual private networks, and the network may also utilize any suitable hardware technology to connect devices such as, for example, optical fiber, Ethernet, ISDN (Integrated Services Digital Network), T-1 or T-3 link, FDDI (Fiber Distributed Data Network), cable or wireless LMDS network, Wireless LAN, Wireless PAN (for example, IrDA, Bluetooth, Wireless USB, Z-Wave and ZigBee), HomePNA, Power line communication, or telephone line network. Such a network connection can include intranets, extranets, and the Internet, and may contain any number of network infrastructure elements including routers, switches, gateways, etc., and can comprise a circuit switched network, such as the Public Service Telephone Network (PSTN), a packet switched network, such as the global Internet, a private WAN or LAN, a telecommunications network, a broadcast network, or a point-to-point network.

In the exemplary embodiment depicted in FIG. 7, ontological information base 12 includes an ontology data store 14 that stores information defining the conceptual primitives that are used to construct, represent, and manipulate arguments within Darbitrage system 10. More particularly, ontology data store 14 stores ontological information providing a base vocabulary for all arguments handled within system 10, the types of arguments that can be represented and analyzed using system 10 and the structures that are available for representing each type of argument, the components of each type of argument together with relations between these components and modifiers of the components and relations, and the range of collaboration and interaction options and settings that are available for each type of arguments and the components of each argument type. As will be described in greater detail below, the information stored in ontology data store 14 is used for determining the specifications that define how each particular argument is handled within system 10.

The base vocabulary stored in ontology data store 14 can be used to define classifications for the basic units of propositional and logical information that are common to and used for logically constructing arguments constructed within the system. For example, these classifications may comprise a vocabulary that defines these basic units in terms of "statements," which are declarations or propositions that could be true or false, "warrants," which are statements setting forth logical rules or principles, "claims," which are statements of conclusions for which other statements are provided as support to attempt to indicate the truth thereof, "premises," which are the statements provided as support to attempt to indicate the truth of a claim, "conditional statements," which are warrants that entail an antecedent statement and a consequent statement (for example, statements having an "if, then" form), "sub-claims," which is a classification for premises for which the truth or falsity thereof is not known, "qualifiers," which are classifications of degree indicating the probability of the truth of a sub-claim, "arguments," which are sets of statements that include a claim and one or more premises provided to attempt to indicate the truth of the claim, "valid," which is a classification for arguments in which the claim of the argument must be true if the premises of the argument are true, "invalid," which is a classification for arguments in which it is possible the claim of the argument to be false if the premises of the argument are true (in other words, the premises do not guarantee the truth of the claim), "sound," which is a classification for valid arguments in which all the premises are actually true, "unsound," which is a classification for arguments that are either valid with at least one false premise or invalid, "strength," which is a classification of degree for invalid arguments that indicates a likelihood that the claim is true given the truth of the premises, "strong," which is a classification for invalid arguments for which the truth of the claim is likely given the truth of the premises, "weak," which is a classification for invalid arguments for which the truth of the claim is unlikely given the truth of the premises, "cogent," which is a classification for strong arguments in which the premises are actually true, "uncogent," which is a classification for arguments that are either strong with at least one false premise or weak, and various classifications of value for arguments that may be assigned based on analysis of the arguments conducted within system 10.

The types of arguments that are stored in ontology data store 14 may include, for instance, various deductive arguments (which may, for example, be assigned a value classification of "successful" within system 10 if determined to be valid) and non-deductive arguments (which may, for example, be assigned a value classification of "successful" within system 10 if determined to meet at least a specified degree of strength for the argument) such as inductive arguments, arguments by analogy, abductive arguments, and transitional arguments, as well as any other types of arguments that are suitable for representation and analysis within exemplary embodiments of the present invention. The components, modifiers, and relations that are defined by information stored in ontology data store 14 for the logical structure of each type of argument may be derived from, for example, educated ontologies that are based formal rules of logic as well as informal ontologies that are based on reasoning that typically occurs in natural conversations.

The range of collaboration and interaction options and settings that are defined by information stored in ontology data store 14 for each type of argument and the components of each argument type may be based on, for example, underlying models for various communication acts and processes that may be desired such as single-party linear arguments submitted for collaborative discussion and/or review, threaded discussions involving multiple parties and competing conclusions, dialogue games involving two or more parties (for which the settings may involve rules of gameplay such as players turn taking and scoring), live discussions involving synchronous communication between multiple parties submitting information via one or more client systems to system 10 in a continuous manner, and argumentation involving asynchronous communication from communities having a large number of participants (and, therefore, typically a large number of contributions), as well as underlying models for various argumentation domains such a law, science, business, etc.

The structures that are available for representing each type of argument that are defined by information stored in ontology data store 14 may include various structures that are suitable for representing that particular type of argument and for accommodating the range of collaboration and interaction options and settings that are defined for the type of argument. For example, the structures that are defined by information stored in ontology data store 14 may be implemented to employ visual representations of arguments which users may contribute to and interact with in various manners that include or otherwise provide for one or more of graphics-based representations that utilize boxes or nodes to represent argument components and edges to represent relations between the argument components, linear and threaded text-based representations, matrix representations in which the rows and columns represent argument components and the cells represent relations between the components, hierarchically nested frames, hyperlinks, annotations, and embedded or separate threaded and/or chat discussions. Each of the various structures may further be implemented with restrictions on the representation of argument components and the relations therebetween (for instance, a tree structure that is restricted to a single root element for arguments involving a single conclusion).

In one general example of a structure that may be defined in ontology data store 14, arguments can be constructed and represented using a logical structure that comprises two or more tree structures with contradicting or competing claims in which the root of each tree is a claim that branches out to nodes that are premises and the edges connecting the claim and the premises are warrants. Because the truth or logical values (or states) of claims, premises, and warrants may not be known for certain, the tree structure can be annotated with qualifiers to indicate respective probabilities. A premise that is disputable may be represented in the tree structure as a sub-claim.

Figure 8:
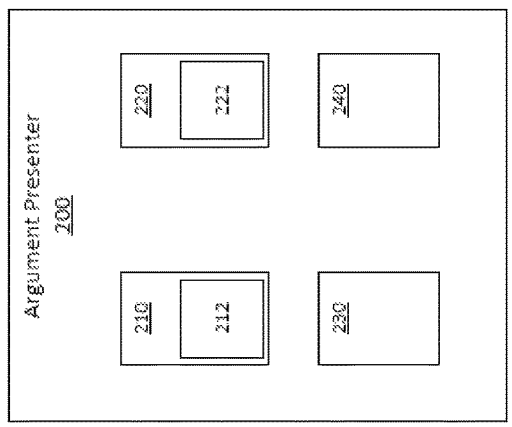
FIG. 8 is a schematic diagram illustrating an argument presenter component of the exemplary distributed processing system provided in FIG. 7.

In the present exemplary embodiment, as illustrated in FIG. 7, ontological information base 12 is communicatively coupled to argument presenter 200. FIG. 8 illustrates an exemplary embodiment of the components of argument presenter 200, which includes an input processor 210 configured to receive a set of input information related to an argument provided within system 10, an argument constructor 220 communicatively coupled to the input processor and configured to construct a multi-layered representation of the argument based on the input information according to a particular argument type and other settings specified from ontological information base 12, and an argument representation component 230 communicatively coupled to the argument constructor and configured to provide an output of the constructed argument as a logical argument data object in a format that is, for example, suitable for rendering in a user interface, performing a logical analysis of the argument based on based on the respective associated states of the statement elements included in the argument and the logical relations defined by interconnections between the statements in the argument, and/or for storage in knowledge base 500. Input processor 210 and argument representation component 230 are also communicatively coupled to knowledge base 500, and argument constructor 220 is also communicatively coupled to ontological information base 12. As further illustrated in FIG. 8, argument presenter 200 also includes a local memory unit 240 that is used by the other components of argument presenter 200 during construction and representation of the logical argument object for storing information being utilized and generated for the argument.

The set of input information that input processor 210 may receive for an argument to be constructed can include a content upon which the discrete elements of the argument to be represented are selected from or otherwise based upon and may also further include information describing the content and information pertaining to configuration, other setting selections, and any other information that may be relevant to operations within system 10 regarding the argument to be constructed and presented. Such other information may include, for example, a base set of fact statements that are available for inclusion in the particular argument. In exemplary embodiments, one or more of these fact statements could be marked with an indication that the underlying propositional content of the statement should be accepted as true for purposes of the particular argument. This information may be submitted in conjunction with a request to construct the argument representation by a user of a common client accessing Darbitrage service platform 20 over network 60 via common user interface 34. The content can be submitted in various manners and formats and, upon receiving the set of information input by the user, input processor 210 operates to generate a text-based data object representing the content in textual form, which may be generated according to any information describing the content and any information pertaining to configuration and setting selections included in the set of information and submit the text-based data object to argument constructor 220.

In exemplary embodiments, the content can be submitted to input processor 210 as a data object can encompass information in any of a variety of data formats such as text, audio, multimedia, voice, video, or any other suitable format that can be represented or converted for representation as a text-based object or, alternatively, a uniform resource identifier (URI) or other reference type that identifies the location of information based upon which the text-based data object is to be generated. For content that is submitted as a simple text object, for instance, the text-based data object generated by input processor 210 may simply comprise the textual content along with metadata labels for various aspects of the content generated based on any information describing the content submitted therewith. For content that is submitted as a uniform resource locator (URL) for a text article hosted at web page on the world wide web, for instance, input processor 210 can be configured to retrieve the identified web page by accessing the internet via network 60 and generated the text-based data object as textual content of the article along with suitable metadata labels based on both information describing the content submitted by user and information from the web page that may be relevant to operations within system 10 regarding the argument to be constructed. In exemplary embodiments, for situations such as one in which the submitted content is a URL for a text article hosted at a web page, the set of input information received for the argument to be constructed can include a description of a particular portion of textual content from the web page for which the discrete elements of the argument to be represented are to be based upon or from which discrete elements can be selected for inclusion within the argument.

In the present exemplary embodiment, input processor 210 is implemented with a data conversion component 212 for performing conversion of non-text information to text information when generating the text-based data object for a content submission by a user. Conversion component 212 can, for example, leverage speech-to-text conversion technology, along with video tagging, and thereby transform information within a media file (video, audio, etc.) into a text-based data object that is suitable for processing by argument constructor 220. Speech recognition can be employed by conversion component 212 in various media contexts (for example, video files, teleconferences, phone voicemails, dictation, etc.) and in any number of suitable formats such as flash video (FLV), MPEG, MP4, MP3, WMV, audio video interleaved (AVI), MOV, Quick Time (QT) VCD, MP4, DVD, etc. In one example, for content that is submitted to or otherwise retrieved by input processor 210 as a video file, the input processor may generate the text-based data object by identifying and converting the audio information to text and further tagging the text with descriptive data based on any other information in the video that may be relevant within system 10 regarding the argument to be constructed for the content such as, for example, displayed text information, timestamps, and recognized visual cues.

In the present exemplary embodiment, argument constructor 220, upon receiving the text-based data object generated by input processor 210, constructs a multi-layered representation of an argument based on the data object that includes an annotated content layer, an argument model layer to which information represented in the annotated content layer is linked, and a feedback layer to which information represented in the argument model layer and/or the annotated content layer is linked. The aspects of this multi-layered representation will be described in greater detail below. To generate this representation, argument constructor 220 generates or otherwise obtains the logical argument object for the argument, which is a structured argument model or map that is based on statements identified from the content data object as a logical representation of the structure of reasoning among the statements that forms the argument being constructed based on the set of input information in informal logic. The logical argument object corresponds to the argument model layer and provides a structured mapping of the discrete elements that represent the conceptual and/or logical structure of an argument formed from the identified statements such as, for instance, primary claims, sub-claims, warrants, premises, qualifiers, etc., and provides the basis of the visual representation used for the argument model layer.

In exemplary embodiments, the elements of the structured argument model can be obtained by argument constructor 220 in various ways. For example, argument constructor 220 can be configured to automatically generate the argument model by performing an analysis of the text-based data object received from input processor 210. To perform this automatic generation, argument constructor can employ a natural language processing (NLP) component 222 to assist in operations of analyzing the text-based data object to identify the type of argument to be represented, accessing the information stored in ontology data store 14 to select a particular argument structure to use for modeling the argument based on the identified type of argument as well as any information describing the content and any information pertaining to configuration and setting selections provided within the data object (such as user rights or a particular number of arguments in for a multiple-argument type), and further interpreting the textual content of the data object to identify and model the statements identified from the textual content and the relationships among the statements according to the specifications for the argument structure selected for modeling the argument that are set forth by information in the ontology data store.

For example, NLP component 222 can be implemented to identify discrete sentences and phrases of the textual content according to syntactical and semantic rules of the language in which the textual content is provided and then further interpret the identified sentences and phrases according to the specifications for the selected argument structure stored in ontology data store 14 to identify the discrete statements and the relationships between the statements to generate an argument model that represents the textual content according to the specifications for the selected argument structure. As general examples, NLP component 222 can be configured to interpret the discrete sentences and phrases identified in the textual content to identify premise statements according to particular indicating terms and phrases such as "because," "the reason is that," and "based on," claim statements according to particular indicating terms and phrases such as "therefore," "consequently," and "it follows that," and rewrite any identified statements extracted from phrases rather than sentences so each identified statement is a complete and independent statement that can be understood without reference to other sentences, and identify particular characteristics of statements by the language indicated by the language, such as implied statements that are unstated but can be derived from the textual content, premises for which the truth is stated as merely being assumed for the purpose of exercise, premises for which the truth is expressed as being a particular probability, statements that are expressed as rhetorical questions, and expressed or implied qualifications of statements. The argument model that is generated by argument constructor 220 may, for example, be generated using certain rules that are specified for the selected argument structure in ontology data store 14 for representing various statement characteristics.

Moreover, the argument model that is generated by argument constructor 220 may include structural indicators for particular logical argument structures identified by NLP component 222 based on indications from relative locations of terms and phrases within the textual content such as linked premises that operate in conjunction with one another to support a claim, convergent premises provided as separate, independent reasons for supporting a claim, sub-claims in chained argument structures, and more complex argument structures, statements that are included in the textual content as objections to claims being asserted, and statements that are included in the textual content as replies to such objections.

Another way in which argument constructor 220 can be configured to obtain the structured argument model is by receiving the argument model from argument arbiter 400. For example, the text-based data object generated by input processor 210 may be submitted to argument arbiter 400 through which a user having arbiter rights within exemplary system 10 may operate arbiter client application 52 to access the information of the data object over network 60 via arbiter user interface 54 and utilize functionalities implemented within the arbiter user interface by arbiter review component 420 to manually generate the logical argument object for the argument model based on the data object information. Upon the argument model being manually generated using argument arbiter 400, the argument model can be passed to argument constructor 220. In various non-limiting exemplary embodiments, argument presenter 200 can be implemented to submit the text-based data object to argument arbiter 400 for construction of the argument model by default, in response to an indication included within the set of input information that is submitted for an argument to be constructed, or in response to a determination that argument constructor 220 is unable automatically generate an adequate argument model by performing an analysis of the text-based data object. This determination may be made, for instance, automatically by input processor 210 based on the data object or by argument constructor 220 upon an attempt to automatically generate argument model.

Yet another way in which argument constructor 220 can be configured to obtain the structured argument model is by providing functionality that allows the user to manually generate the logical argument object for the argument model using common or arbiter user interface 34, 54. For example, argument presenter 200 may be implemented to provide an option for the user to, upon generation of the text-based data object by input processor 210, operate a client application to access the information of the content data object over network 60 via common or arbiter user interface 34, 54 and utilize functionalities provided by argument constructor 220 within the common user interface to manually generate the argument model with reference to the data object information.

Figure 3:
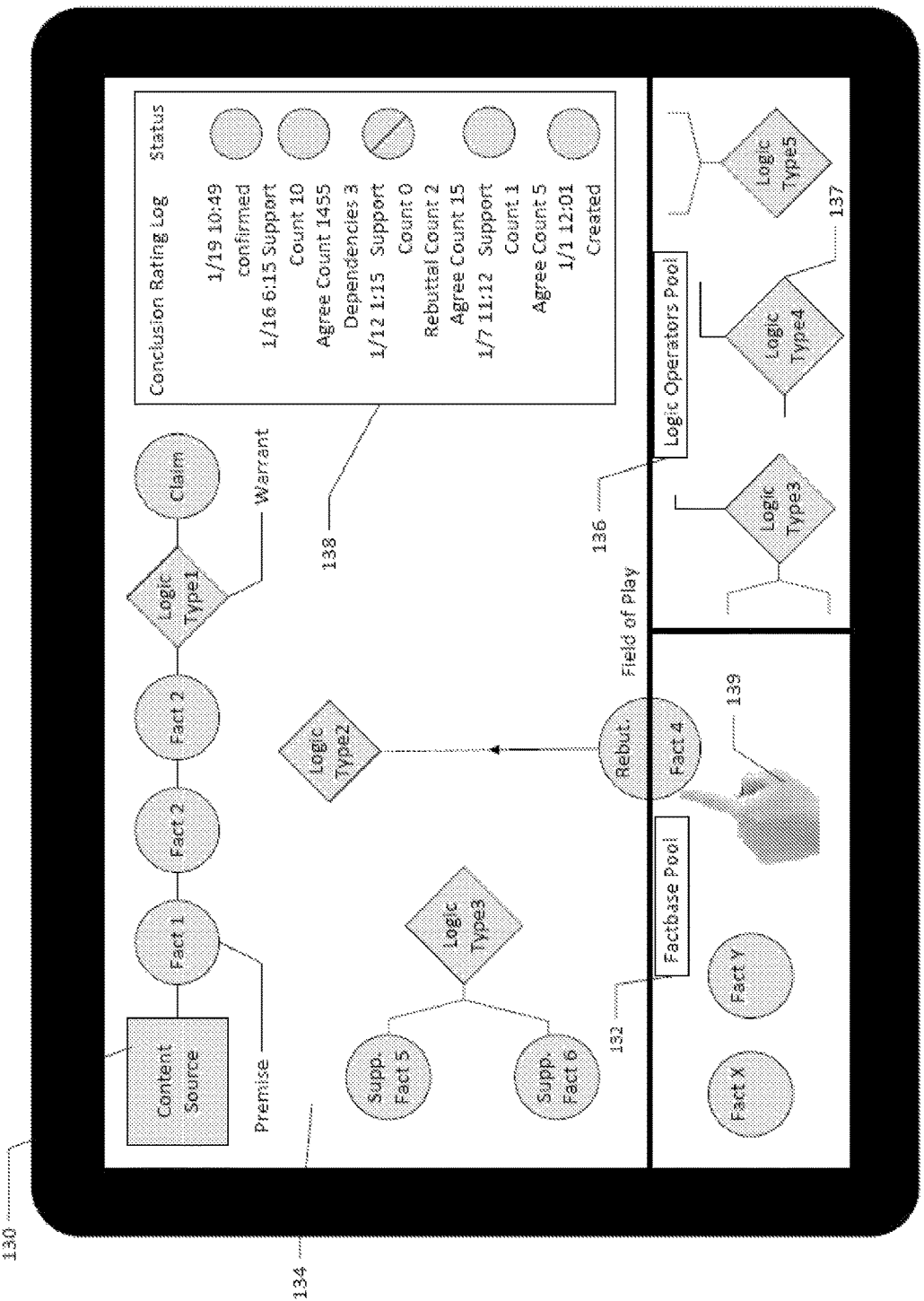
FIG. 3 is an illustration of an example of a structured argument representation of proposition-based content being constructed based on available statement elements within an argument workbench provided by a graphical user interface implemented in accordance with an exemplary embodiment of the present invention.

For example, as illustrated in the example depicted in FIG. 3, argument constructor 220 can be configured to implement an argument workbench 130 within GUI provided via common or arbiter user interface 34, 54 that includes an argument construction window 134, an available premise window 132, and an available warrants window 134. Essentially, the example argument workbench 130 of FIG. 3 represents a set of propositional content that is available for use in the structure of an argument under construction as a plurality of available statement elements in which each of the available statement elements is one of a plurality of statement types including premise, warrant, and claim. The set of available statement elements can be generated and represented within argument workbench 130 based on the set of corresponding statement element objects that are included within the content data object for the argument. The statement elements listed within available premise window 132 are statement elements corresponding to an underlying propositional statement that are available for use as either of a premise or a claim within the logical structure of the argument being constructed, and the statement elements listed within available warrants window 134 are statement elements that are available for use within the logical structure of the argument being constructed as either a warrant corresponding to an underlying logical rule for the available premises or claims or an available warrant type that a user can select in conjunction within other selected statement elements selected to form an underlying logical rule for the statement elements selected in conjunction therewith.

For this purpose, the corresponding statement data object for each available statement element can include a plurality of data fields including a statement type field holding data indicating the statement type of the statement element, a proposition field holding data indicating an underlying proposition represented by the statement element, and an associated state field holding data indicating a respective associated state of the statement element. The respective associated state is a value associated with the underlying proposition represented by the statement element that is, a truth or logical value of a claim, a premise, or a warrant. For example, in the corresponding statement data object for an available statement element for which the statement type is premise or claim, the data that is held in the proposition field for indicating the underlying proposition represented by the statement element is textual content. Similarly, the corresponding statement data object for an available statement element for which the statement type is warrant, the data that is held in the proposition field for indicating the underlying proposition represented by the statement element is an indication of the respective logical rule for the statement element that is defined in terms of a corresponding logical operation that is performed to generate an output value based on one or more input values, and the resulting output value for the warrant (which may depend on the one or more input values at any given time) can be held as the respective associated state for the warrant statement element in the corresponding statement element object.

Figure 1B:
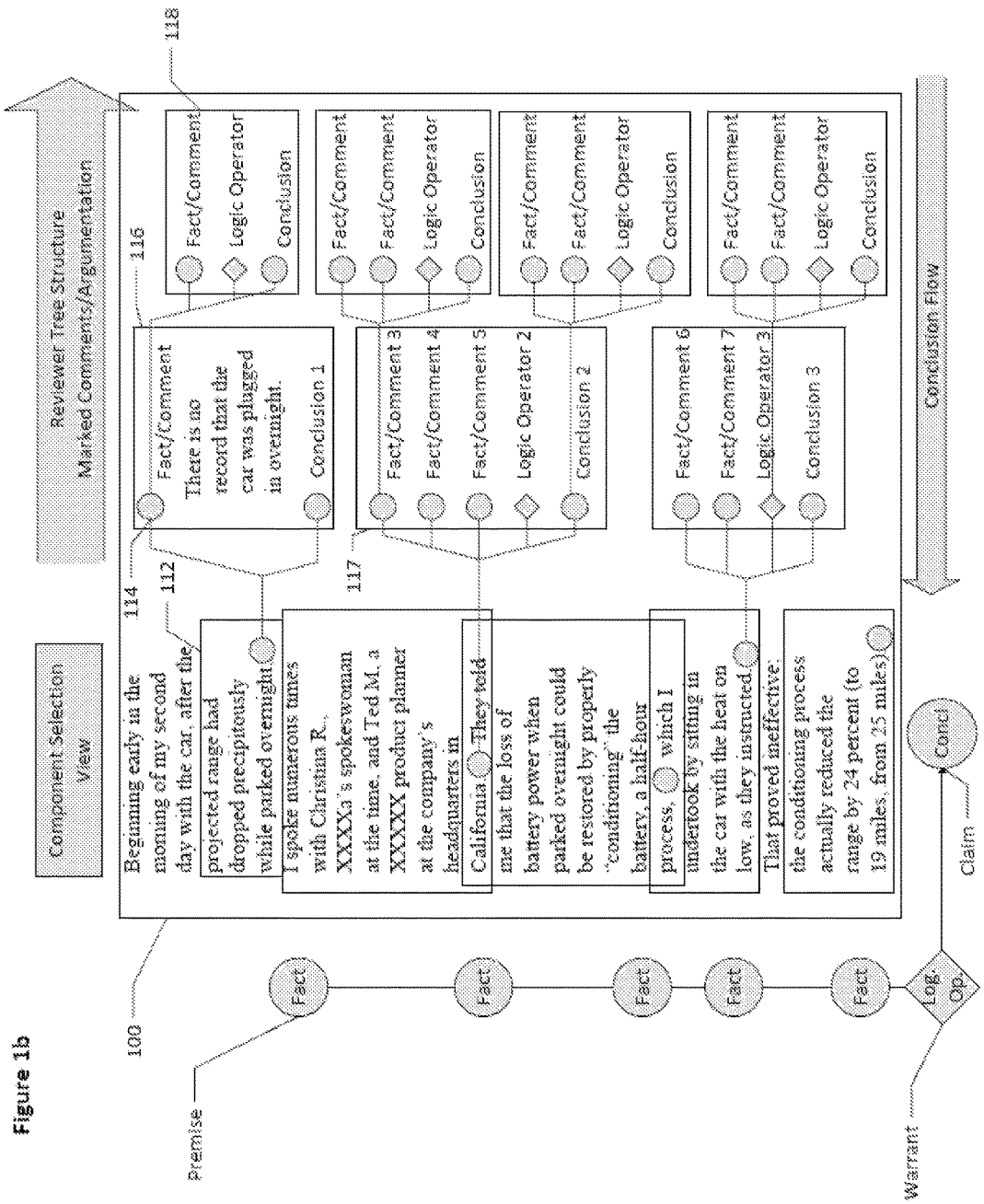

In exemplary embodiments, the corresponding statement element objects for the statement elements listed within available premise window 132 and available warrants window 134 can be generated based on information provided from or obtained from any number of suitable content sources. For example, the corresponding statement element objects for at least some of the statement elements can be obtained from the input processor 210 as described above. As another example, the corresponding statement element objects for at least some of the statement elements can be obtained from a fact database 530 of knowledge base 500 within which a plurality of predefined statement elements objects that have each been created for respective individual information items are stored. Alternatively, a user may similarly operate a client system to utilize functionalities implemented within arbiter or common user interface 34 by argument constructor 220 over network 60 to manually generate all or some content of an argument model without reference to any generated data object. As a simple example, the corresponding statement element object for at least some of the statement elements can be generated based on input provided from a user via interface elements of the user interface implemented by argument constructor 220 for defining statement elements. As another example, the user can simply enter values corresponding to the data fields of a statement element object or, as shown in FIG. 1b, argument constructor 220 can be configured to provide a display of the textual content of the test-based data object via textual content selection window 100 of the GUI and provide interface elements for allowing the user to select and interact with corresponding portions of the textual content displayed within the textual content window (for example, portion 112 in FIG. 1b) to define values corresponding to the data fields of statement element objects based on the selected portions of the textual content.

In the example depicted in FIG. 3, during construction of the argument via the user interface implemented by argument constructor 220, the argument constructor operates in conjunction with argument representation component 230 to allow the user to visually construct the elements and logical structure of the argument within argument construction window 134 by selecting one or more premises and a claim from available premise window 132 (the user interface may, for example, provide an option for the user to designate one of the available premises as a claim of the argument) and one or more warrants from available warrant window 136 and interconnect this selected set of the available statement elements in the argument construction window according to the specifications for a particular argument type selected from ontological information base 12. The interconnections between the statement elements defined by the user in this manner represent logical relations between the one or more premises, the one or more warrants, and the claim according to respective logical rules for the one or more warrants such that the respective associated state of the claim is dependent upon the respective associated states of the one or more premises and the one or more warrants and the logical relations defined by the interconnections of the argument.

In this regard, as noted above, the statement elements listed within available warrants window 136 may be an available warrant type that a user can select in conjunction within other statement elements selected to form an underlying logical rule for the statement elements selected in conjunction therewith. For example, the interface elements implemented within argument workbench 130 can allow the user to access any of a set of warrant types, such as warrant type 137 in FIG. 3, that are predetermined based on the particular argument type selected from ontological information base 12 for the argument and define at least one warrant of the argument by designating a location within the logical structure of the argument in argument construction window 134 for interconnecting the selected warrant type in the argument construction window according to a logical specification for the selected warrant type. In conjunction therewith, argument constructor 220 can generate the corresponding statement element object for the statement element for each warrant defined in this manner for inclusion within the content data object for the argument.

During construction of the argument via the user interface implemented by argument constructor 220, argument constructor can be configured to generate and dynamically update the logical argument object for the argument based on the construction of the logical structure of the argument by the user within argument construction window 134. Likewise, argument representation component 230 can be configured to generate and dynamically update the structured argument model representation of the logical argument object displayed within argument construction window 134 in conjunction with the logical structure of the first argument constructed by the user. As illustrated in FIG. 3, the structured argument model representation of the logical argument object for the argument within the user interface can include an indication of each of the one or more premises, the one or more warrants, the claim, the interconnections between the one or more premises, the one or more warrants, and the claim. The representation may also include an indication of the respective associated state of each of the one or more premises, the one or more warrants, and the claim.

Moreover, during or upon completion of manual construction of the argument via the user interface implemented by argument constructor 220, the argument constructor can also be configured to submit the a request to automated argument analyzer 430 of argument arbiter 400 to perform an analysis of the logical argument object that is generated or being generated to determine the respective associated state of the first claim based on the respective associated states of the one or more premises and the one or more warrants and the logical relations defined by the interconnections in the argument, and argument representation component 230 can be configured to automatically update the representation of the argument within argument construction window 134 based on this determination.

In exemplary embodiments, the particular argument type of an argument for which a logical argument object is constructed and maintained within system 10 may be a multiple-argument type. For instance, as also illustrated in the example shown in FIG. 1b, there are a plurality of arguments (for example, arguments 116 and 117) for which a logical argument object is constructed using the corresponding textual content that is displayed within textual content window 100. Each of the arguments is constructed to correspondingly include one or more premises and one or more warrants of the statement elements, a respective claim of the statement elements, and a plurality of interconnections defining logical relations between the one or more premises, the one or more warrants, and the respective claim according to respective logical rules for the one or more warrants. As with a single argument, the respective associated state of the respective claim is dependent upon the respective associated states of the one or more premises and the one or more warrants and the logical relations defined by the interconnections of the argument, and the structured argument model representation of the logical argument object is generated by argument representation component 230 to include indications of the one or more premises, the one or more warrants, the respective claim, the interconnections between the one or more premises, the one or more warrants, and the respective claim, and the respective associated states of the one or more premises, the one or more warrants, and the respective claim for each of the multiple arguments.

Upon completion of manually generating the argument model, argument constructor 220 may also be configured to submit the logical argument object to input processor 210 as the argument content, in response to which the input processor may then operate to generate a text-based data object representing the logical argument object, which may be generated according to any information describing the argument model and information pertaining to configuration and setting selections included in the set of information submitted by the user (for example, the particular argument type). In this scenario, the textual content of the data object may be, for instance, a simple, logically-organized linear list of the underlying propositions represented by the statement elements included in the argument model. In exemplary embodiments, following generation of the text-based data object in this manner, input processor 210 may then return the text-based data object to the argument constructor 220 for construction of the annotated content layer as described below.

In exemplary embodiments, argument presenter 200 may implement various mechanisms for providing additional review of the generated argument model and providing for modifications to be made to the argument model based on additional review. For example, argument presenter 200 may be implemented to provide an option for a user to, upon generation of an argument model generated by argument constructor 220, operate a common client or an arbiter client to access the generated argument model over network 60 and utilize functionalities provided within common user interface 34 or arbiter user interface 54 to manually review and modify the argument model with reference to the data object information. Argument presenter 200 may also be implemented to provide, for a manually generated argument model, an option for a user to, via a client user interface, direct argument constructor 220 to perform an automatic review of the argument model with reference to the data object information and to automatically modify the argument based on the review. In addition, argument presenter 200 can be implemented to provide an option for a user that is operating a common client to generate an argument model to have the argument model submitted to argument arbiter 400 through which a user having arbiter rights within exemplary system 10 may operate arbiter client application 52 to access the argument model over network 60 via arbiter user interface 54 and utilize functionalities implemented within the arbiter user interface by arbiter review component 420 to review and correspondingly modify the argument model.

In the present exemplary embodiment, upon obtaining the argument model that is generated in conjunction with the text-based data object, argument constructor 220 automatically constructs the annotated content layer by generating links between the information in the textual content and corresponding portions of the argument model layer and modifying the textual content to include indications of the links. The particular links that are generated between the textual content and the argument model layer and the format of the link indicators can be determined by argument constructor 220, for example, according to certain rules that are specified for the selected argument structure in ontology data store 14 as well as any information describing the content and information pertaining to configuration and setting selections provided by the data object. The links may be generated as respective correspondences between various partial and full aspects of the textual content and various partial and full aspects of the argument model, and the link indicators may be formatted in association with the respective textual content aspect.

As noted above, argument constructor 220 also constructs the argument model layer by creating a corresponding data object for each discrete element of the structured argument model. The data objects for the discrete elements, also referred to herein as statement elements, may each include various items of information pertaining to the element and various functional operations that may be performed with regard to the element including, for example, functions that may result in elements being added to or deleted from the argument model and other modifications to the argument model, as will be described in greater detail below. The information and functions provided for each corresponding statement element object can be determined by argument constructor 220, for example, according to certain rules that are specified for the particular element type within the selected argument structure in ontology data store 14 as well as any information describing the content and information pertaining to configuration and setting selections provided by the text-based data object. The various types of elements of the argument model for which element objects are created by argument constructor 220 can also, for example, be determined according to certain rules that are specified for the selected argument structure in ontology data store 14 as well as any information describing the content and information pertaining to configuration and setting selections provided by the data object. There may be various levels of granularity for the types of elements that are specified for a selected argument structure such that argument model content that is included within less fine-grained element types is also included within more fine-grained element types.

Upon creating a data object for each discrete element of the structured argument model to construct the argument model layer, argument constructor 220 further constructs the feedback layer by creating a corresponding feedback data structure for each corresponding statement element object created within the structured argument model. Argument constructor 220 also generates a link between each statement element object and the corresponding feedback data structure created for the element object. The feedback data structure for each element object includes fields for holding various items of information that may be generated in response to utilization of the functional operations included within the corresponding element object and/or other interactions with the corresponding element that may be performed within system 10, as will be described in greater detail below. The particular data fields provided in each feedback data structure can be determined by argument constructor 220, for example, according to certain rules that are specified for the particular element type of the corresponding element object in ontology data store 14 as well as any information describing the content and information pertaining to configuration and setting selections provided by the text-based data object.

Upon instantiation of a feedback data structure, the content of the fields of the feedback data structure for an element object may initially be empty. Alternatively, argument constructor 220 may be configured to include information in certain fields of the feedback data structures during creation of the feedback layer. This initially included information may be, for example, information describing the decision-making used for determining the role of the corresponding element within the argument model and information describing any history of modifications related to the corresponding element during construction of the argument representation. For any such information that is initially included within a feedback data structure, argument constructor 220 may further annotate the argument model layer such that the existence of the information within the feedback data structure is indicated by the corresponding element object and generate a link between the information within the feedback data structure and the indication that is provided therefor by the corresponding element object. In addition, argument constructor 220 may also generate links between certain properties of each statement element object within the argument model layer and certain fields of the corresponding feedback data structure that is created for the element object. These initially generated links can be determined by argument constructor 220, for example, according to certain rules that are specified for the particular element type of the corresponding element object in ontology data store 14 as well as any information describing the content and information pertaining to configuration and setting selections provided by the text-based data object.

Upon creation of the feedback data structures for the feedback layer, the multi-layered representation of the argument has been constructed by argument constructor 220, which will then pass the constructed argument representation to argument representation component 230. Argument representation component 230 is configured format the constructed argument representation in a manner that enables the argument representation to be rendered in common user interface 34 and arbiter user interface 54 to thereby be accessible by users operating client applications on client systems. In the rendered argument representation, the layers can be provided in a layered-view format, with the annotated content layer being provided as a top view layer. In exemplary embodiments, the annotated content layer view may be provided as a marked-up display of the textual content. For instance, in the example illustrated in FIG. 1a, an annotated content layer view 100 is provided with a marked-up display 102 of the textual content included for this example. In other exemplary embodiments, the annotated content layer view may incorporate the original content based upon which the argument representation was constructed or a modified version thereof such that the annotated content layer view is provided as a marked-up form of the original content or a modified form of the content. For example, in a situation where the original content was a web page, the annotated content layer view may be provided as a marked-up form of the web page that incorporates some or all of the elements included in the web page in addition to the textual content thereof.

Each link between the annotated content layer and the argument model layer can be represented in any suitable manner in the annotated content layer view and accessible via the user interface (for example, by way of a mouse click or rollover operation) to provide for rendering of the elements in the argument model layer corresponding to the link, which may consist of all elements or a corresponding subset of the elements in the argument model layer, in an argument model layer view. In addition, the representation of each link within the annotated content layer view may also be provided in a manner that is indicative of certain items of information included in the element objects for the elements in the argument model layer corresponding to the link.

In general, argument representation component 230 formats the argument representation such that the argument model layer view is rendered as a logical and functional display of the statement elements within the structured argument model. The argument model layer view can be rendered for each element being displayed such that properties of the statement element object constructed for the element will be displayed and/or otherwise accessible to the user via the user interface. For example, in conjunction with each displayed element, the rendering may provide visual depictions or indications of items of information included in the element object for the element or various UI elements that can be accessed to reveal or return such depictions or indications, various UI elements that can be used to access functional operations included in the element object for the element, and links accessible by the user in the display to return to or display corresponding portions of the annotated content layer view.

Moreover, each link between the argument model layer and the feedback layer can be represented in any suitable manner in the argument model layer view and accessible by the user via the user interface to provide for rendering of the information in the feedback layer corresponding to the link in a feedback layer view. In addition, argument representation component 230 may also format the argument representation such that each statement element object within the argument model layer view is rendered in a manner that is indicative of certain items of information that are maintained in the corresponding feedback data structure for the element object.

Upon formatting the argument representation for rendering as described above, argument representation component 230 may then provide the multi-layered argument representation over network 60 to the user operating a common client via common user interface 34. The example illustrated in FIG. 1b depicts various manners in which the links between the annotated content layer and the argument model layer may be represented. More particularly, in FIG. 1b, the textual content for an argument is displayed within textual content window 100 with a marking indicating a respective association for each annotated portion of the textual content with a corresponding statement element or a corresponding section of the structured argument model representation of the logical argument object. The marking for each corresponding portion of the textual content displayed within the textual content window (for example, portion 112) is accessible within the user interface via user interaction with the corresponding portion of the displayed textual content to access a corresponding section of the structured argument model representation of the logical argument object (for example, corresponding section 116 for portion 112).

In exemplary embodiments, functionality for providing an option and associated controls is implemented within common user interface 34 for allowing the user to review and modify the argument representation in various ways that may be desired by the user. For example, these controls may enable the user to correct items rendered in the argument representation that were incorrectly processed (for example, descriptive information such as author name), to modify the settings of the manner in which various items are rendered in the argument representation, or to limit the argument representation to a certain subset of the textual content for which the argument representation is constructed, and argument representation component 230 can be configured to update the formatting of the argument representation based on any of the modifications requested by the user via common user interface 34.

Upon reviewing the rendered argument representation, the user can indicate acceptance of the argument representation to argument representation component 230 via the user interface. In the present exemplary embodiment, argument representation component 230 may then pass the argument representation to knowledge base 500, which stores the argument representation received from the argument representation component in a searchable argument data store 510 that is used for maintaining and providing access to the argument representations created within system 10 as indexed data records. The argument representations stored in argument data store 510 may be indexed, for example, based on one or more details of the argument representations such as, for example, the user that requested creation of the argument representation, the author of the content, the time at which the representation was created, etc. Argument data store 510 can be accessed to retrieve particular argument representations stored therein based on indexing information that is unique to each argument representation, and can also be accessed to conduct searches of argument representations stored therein based on various aspects of information that are included in the argument representations. In alternative exemplary embodiments, some or all of the argument representation related data can be stored on and accessed from a database in communication with platform 20, and some or all of the user related data may be stored on and access from a database in communication with individual client systems.

In exemplary embodiments, argument representation component 230 may also be configured to generate and provide the user with a unique identifier assigned to the argument representation constructed based on the set of input information submitted by the user. The unique identifier may be, for instance, a URI that references the argument representation stored within knowledge base or a detail based upon which the argument representation is indexed within argument data store 510. It should of course be noted that, in exemplary embodiments, the various components of argument presenter 200 may be configured to generate and provide the user with the unique identifier assigned to the argument representation via common user interface 34 at any point during construction of the argument representation. In this manner, the unique identifier may also be used to, for example, identify the information pertaining to an argument representation being constructed that is stored in local memory unit 240 at any point during the construction. In addition, this unique identifier may also be used for each of the components within system 10 for identifying and referencing the argument representation or, alternatively, a distinct internal identifier used by the components within system 10.

In exemplary embodiments, argument presenter 200 can be configured to dynamically construct the argument representation using similar functionality to that described above in situations in which the set of input information, or the content thereof, is being submitted on-the-fly such as, for example, in the case of streaming video or audio content or where a transcript of an ongoing event is being submitted to input processor as the transcript is being generated. In such exemplary embodiments, argument presenter can be configured perform operations for storing and dynamically updating the argument representation in argument data store 510 as the argument representation is being dynamically constructed. For example, in the example depicted in FIG. 5, argument constructor 220 is configured to implement an argument workbench 150 within a GUI provided via common or arbiter user interface 34, 54 that includes, in addition to an argument construction window, a streaming video window 152 and a transcript window 154 of textual content of a transcript being captured on-the-fly for the streaming video that then serves an annotated content layer view 100 for an argument being constructed in the argument construction window.

In the present exemplary embodiment, once the argument representation has been constructed and stored in knowledge base 500 by argument presenter 200, the argument representation may then be accessed by users that are registered within system 10 through functionality provided by interaction component 300 for perform various actions involving contributing to, discussing, analyzing, building upon, modifying, challenging, and otherwise interacting with the argument representation. More particularly, interaction component 300 can be configured to implement a collaborative environment within system 10 that facilitates continuous and simultaneous communication and argumentation between multiple participants that may be in remote locations throughout the world in a collaborative fashion. Interaction component 300 can provide functionality for implementing the collaborative environment utilizing client/server model of system 10 to enable the collaborative Darbitrage platform 20 to be commonly accessed by each user through a corresponding client system connected via network 60 to the Darbitrage platform such that the multiple users are able to interact with each other as well as the collaborative environment by accessing the Darbitrage platform via their client systems.

Figure 9:
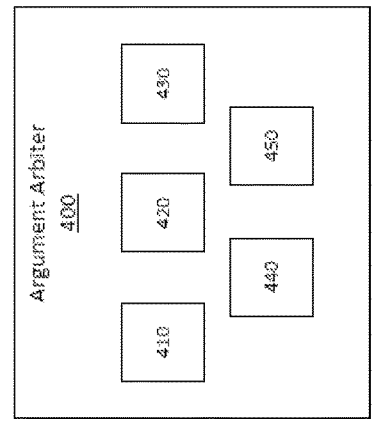
FIG. 9 is a schematic diagram illustrating an interaction component of the exemplary distributed processing system provided in FIG. 7.

FIG. 9 illustrates an exemplary embodiment of the components of interaction component 300. As shown in FIG. 9, interaction component 300 includes a user account component 310, an asynchronous collaboration component 320, a synchronous collaboration component 330, a gameplay component 340, and a local memory 350. In general, interaction component 300 is configured to load argumentation models from interaction component 300 into local memory 350 to be accessed by various users that are registered within system 10 for performing collaboration and interaction with respect to the argumentation representation through various functionalities implemented by asynchronous collaboration component 320, synchronous collaboration component 330, and gameplay component 340 within user interfaces 34, 54. Examples of various functionalities that can be provided variously by these components in conjunction with other components of system 10 in exemplary embodiments are described in greater detail in various sections of the description provided below.

For instance, in exemplary embodiments, interaction component 310 can implement functionality via the user interface that allows one or more users to select any of the statement elements included in an argument within the structured argument model representation of the logical argument object for the argument displayed within argument construction window 134 for which the statement type is premise or warrant, designate the selected statement element as a sub-claim of a sub-argument within the argument (which can be referred to as the base argument), and provide input to define the sub-argument by visually constructing a logical structure of the sub-argument within the argument construction window according to the particular argument type for the base argument specified from the ontological information base 12 to include one or more premises and one or more warrants of the plurality of statement elements, the sub-claim, and a plurality of interconnections defining logical relations between the one or more premises, the one or more warrants, and the sub-claim according to respective logical rules for the one or more warrants such that the respective associated state of the sub-claim is dependent upon the respective associated states of the one or more premises and the one or more warrants and the logical relations defined by the interconnections of the sub-argument.

In this exemplary embodiment, in response to such user interaction, argument constructor 220 can be configured to, construct a logical argument object for the sub-argument based on the logical structure of the sub-argument constructed by the one or more users within argument construction window 134 and update the logical argument object for the base argument to include the logical sub-argument object in association with the selected statement element designated as the sub-claim, automated argument analyzer 430 can be configured to automatically analyze the logical argument object for the sub-argument to determine the respective associated state of the sub-claim based on the respective associated states of the one or more premises and the one or more warrants and the logical relations defined by the interconnections in the sub-argument and, based thereon, further automatically analyze the logical argument object for the base argument to update the respective associated state of any of the one or more premises, the one or more warrants, and the first claim that is dependent upon the respective associated state of the selected statement element designated as the sub-claim in accordance with any change in the respective associated state of the selected statement element designated as the sub-claim. Likewise, argument representation component 230 can also be configured to update the structured argument model representation of the logical argument object for the base argument displayed within the argument construction window to update the indication of the respective associated state of any of the one or more premises, the one or more warrants, and the first claim that is changed based on any change in the respective associated state of the selected statement element designated as the sub-claim, update the indication of the selected statement element designated as the sub-claim to provide an interface element indicating the sub-argument, and expand the structured argument model representation of the logical argument object for the first argument displayed within the argument construction window to include a structured argument model representation of the logical argument object for the sub-argument. In exemplary embodiments, argument representation component 230 can provide a user interface element indicating the sub-argument for the sub-claim that allows the one or more users to direct expansion and contraction of the structured argument model representation in the manner according to predefined user interactions with this interface element via the user interface.

Figure 2B:
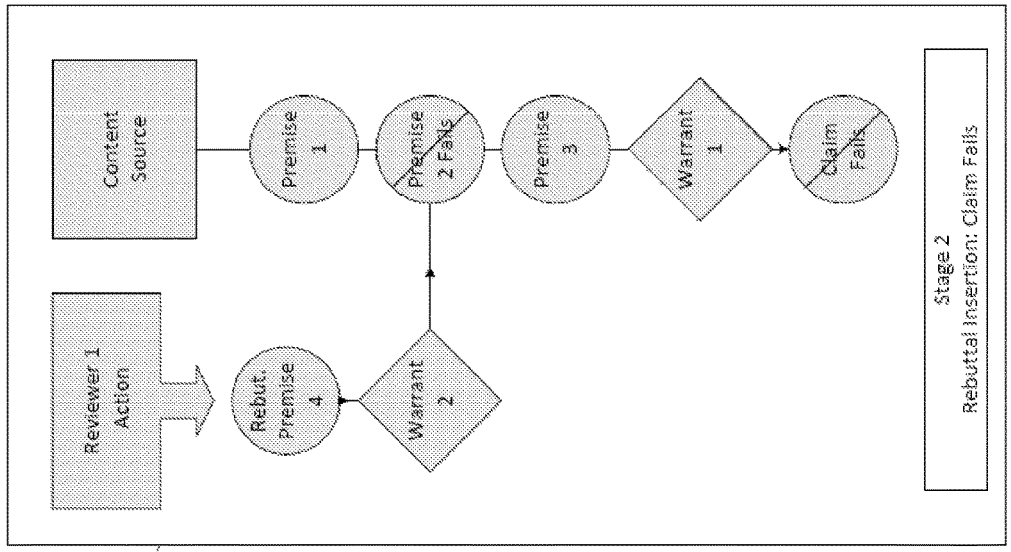
FIGS. 2a-2c illustrate an example of a structured argument representation of proposition-based content being reviewed and modified within an argument model layer view provided by a graphical user interface implemented in accordance with an exemplary embodiment of the present invention.
Figure 2A:
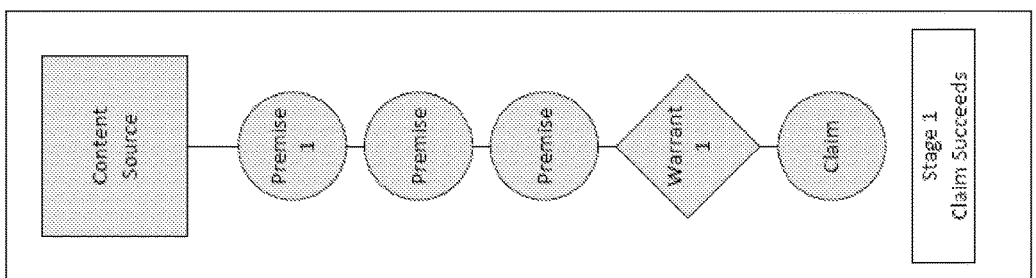
Figure 2C:
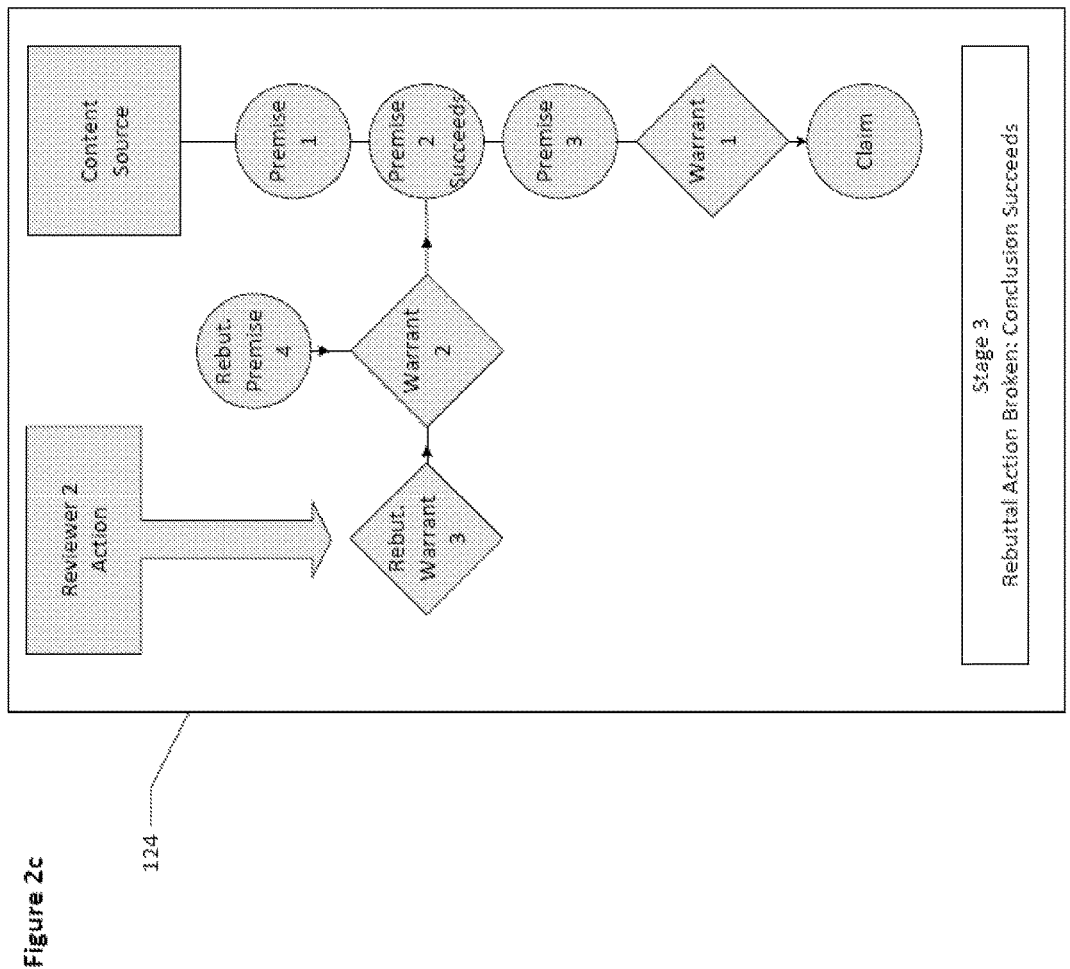

For instance, in the FIG. 1b, a base argument 116 is depicted as having a sub-argument 118 that is generated for a sub-claim that is a statement element included within the base argument 116. A more detailed example is illustrated in FIGS. 2a-2c showing how this functionality can be utilized by multiple users to refine and/or challenge arguments within system 10 via interaction component 300. In FIG. 2a, a single argument 120 is shown as being represented within argument construction window 134. FIG. 2b shows that a first sub-argument 122 has been constructed by a first user for premise 2 that results in a change in the respected associated state of premise 2, and that, as a cascaded result of the change of the respected associated state of premise 2, the respective associated state of the claim of the first argument 120 also changes. FIG. 2c then shows that a second sub-argument 124 has been constructed by a second user for warrant 2 of sub-argument 122 that results in a change in the respected associated state of warrant 2 (that is, the additional input from warrant 3 changes the output value of warrant 2 according to the logical rules of warrant 2), and that, as a cascaded result of the change of the respected associated state of warrant 2, the respective associated states of premise 2 and the claim of the first argument 120 also change.

As noted above, in exemplary embodiments, interaction component 300 is implemented to, at time during which an argument representation is being accessed by one or more client systems via asynchronous collaboration component 320, synchronous collaboration component 330, or gameplay component 340, maintain the argument representation in a persistent manner for the clients systems to enable multiple users to simultaneously and continuously perceive and interact with the argument representation view network 60. For this purpose, interaction component 300 comprises software that runs components of a collaborative environment application continuously on Darbitrage platform 20 to generate and persist the argument representation loaded into local memory 350. In alternative exemplary embodiments, some or all of this software can be stored and/or run on Darbitrage platform 20, and some or all of this software may be stored on individual clients systems accessing the argument representation. Darbitrage platform 20 and interaction component 300 can be configured to handle and verify a large number of connections and apply modifications to the argument representation and to provide a system for recording argument representation data at regular intervals without stopping interaction between users within the argument representation. A user is considered online with respect to a particular argument representation in the collaborative environment implemented by interaction component 300 when the user is accessing Darbitrage platform 20 through a client application and interacting with the argument representation on a regular basis. Conversely, a user is considered offline when the user is not accessing Darbitrage platform 20 through a client application. An argument representation loaded into local memory 350 is persistent because the argument representation may continue to exist and evolve even when a given user is not accessing Darbitrage platform 20.

Figure 4:
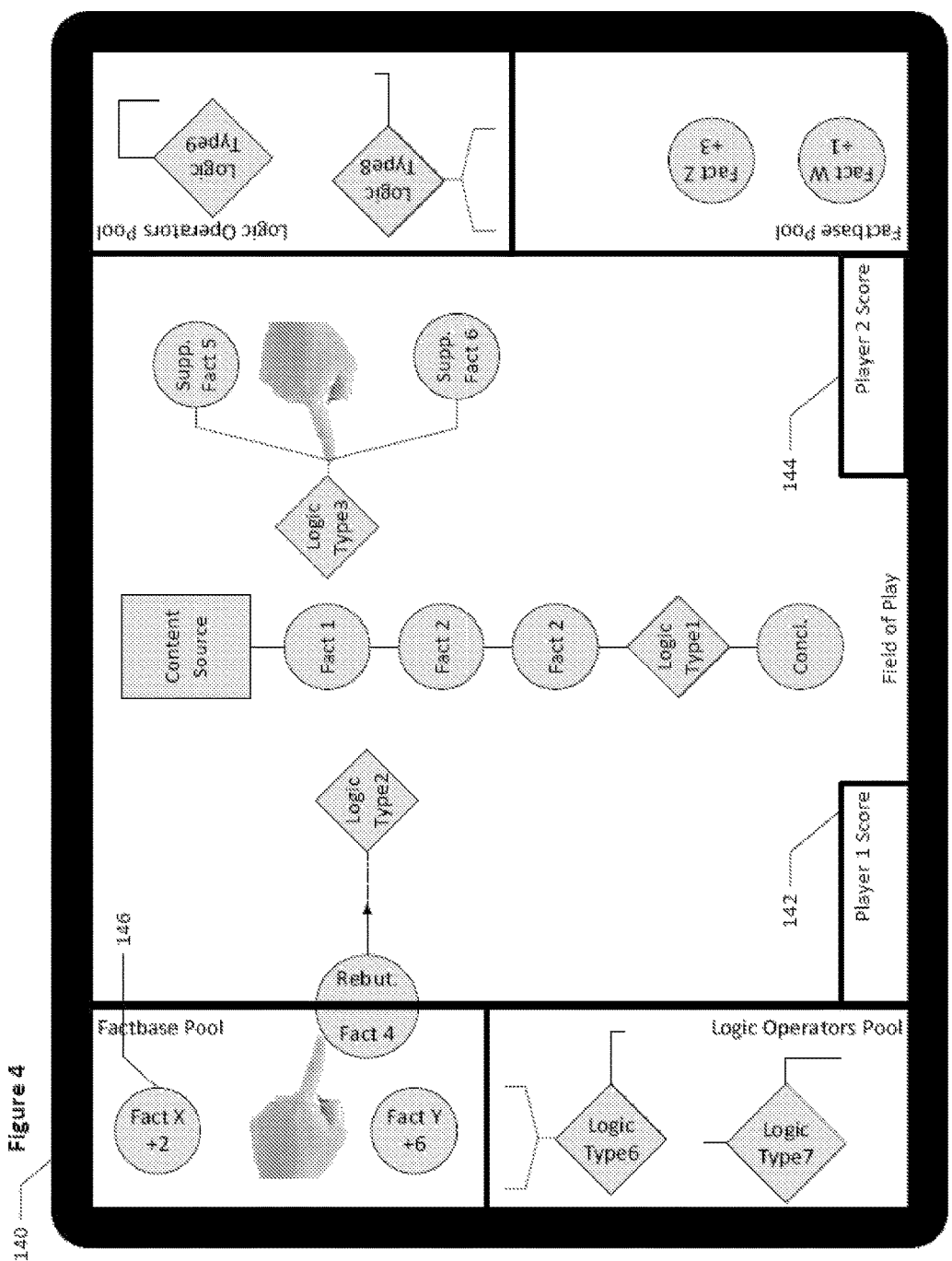
FIG. 4 is an illustration of an example of a structured argument representation of proposition-based content being constructed based on available statement elements provided for user players within an example gameplay setting using an argument gameboard provided by a graphical user interface implemented in accordance with an exemplary embodiment of the present invention.

In some exemplary embodiments, gameplay component 340 of interaction component 310 can implement functionality via the user interface that, for an argument for which the specified argument type is a particular game type, provide the argument representation continuously and simultaneously to a plurality of users through the user interface provided via one or more clients systems communicatively connected by a network and allows the users to simultaneously and continuously perceive and interact with the corresponding statement data object for each of the plurality of statement elements and the logical argument object for the argument through the interface elements provided in conjunction with representations of the statement elements and the structured argument model representation within the user interface according to a set of rules for the game type specified from the ontological information base 12. In these embodiments, gameplay component 240 can be configured to maintain a respective score for each of the users based on user interactions performed for the argument through the interface elements according to the set of rules and to generate a representation of the respective score for each of the users within the user interface. For instance, in the example illustrated in FIG. 4, an argument gameboard 140 is depicted as being implemented within a GUI provided via common or arbiter user interface 34, 54 that includes, in addition to a shared argument construction window, an available premise window and an available warrants window for each of two user players, as well as a respective sub-window 142, 144 for each of the players that displays the respective score for each of the players. The players may accumulate points, for example, according to the effects on the logical argument object that occur as the users continuously construct an argument and sub-arguments therefor within shared argument construction window (the "field of play") using the respective set of statement elements available to each player. As depicted, in the example illustrated in FIG. 4, the available statement elements may each be associated with a corresponding point amount (which may be indicated by a value in a data field of the corresponding statement element data object for each statement element) that can be used for purposes of calculating scores according to the set of rules for the game type when the statement elements are "played" when selected by the users to use in constructing the argument.

Referring again to FIG. 9, in exemplary embodiments, user account component 310 is configured to implement functionality providing for a user operating a common client to register a user account with system 10 over network 60 via user interface 34. In exemplary embodiments, interaction component 300 may require users to register a user account with system to be permitted to access functionality provided by asynchronous collaboration component 320, synchronous collaboration component 330, and gameplay component 340. In exemplary embodiments, users may also need to register with system 10 to be permitted to access the functionalities provided within Darbitrage platform 20 such as accessing argument presenter 200 to have an argument representation constructed.

Darbitrage platform 20 may be configured to maintain, host, and/or otherwise be in communication with a user profile for each user that registers with system 10 via account component 310. In the present exemplary embodiment, the user related data for user profiles is maintained within and accessed from a user profile data store 520 implemented within knowledge base 500 by Darbitrage platform. A user profile includes information related to a particular user. Accordingly, a user profile may be a program instance and/or database record that tracks various user related data that may include but is also not necessarily limited to user identification, authentication information, contact information (for example, email addresses), credentials and areas of expertise, billing information, various rights within system 10, user-initiated argumentation representations maintained in argument data store 510, user interaction history, feedback information regarding the user, and notification rules. For this maintaining this information, data store 520 may include various data structures, such as data structures for logging the activities and interactions of the registered users. In alternative exemplary embodiments, some or all of the user related data can be stored on a database in communication with platform 20, and some or all of the user related data may be stored on a database in communication with individual client systems. For example, some or all of the user related data for a user operating client system 30 can be stored on client system 30.

In exemplary embodiments, account component 310 can be implemented to allow for a user can customize, modify, add additional items or options to, and remove items or options from the user profile as needed via a graphical user interface (GUI) menu screen or other control for viewing and editing user profile information. Interaction component 300 can be configured to allow certain user profile information to be exchanged between users as well as provide users with options to keep certain user profile information fully or partially confidential between a limited number of users. In exemplary embodiments, account component 310 may be configured to provide a notification module and registered users may be provided with respective user agent modules, each configured according to a set of user notifications rules and settings specified in the user profile for the corresponding user. In the exemplary embodiments, the user agents can be implemented on interaction component 300 or, alternatively, each user agent can be implemented on the individual client being operated by the respective user or through a combination of that client and interaction component 300. A user agent monitors events that are relevant to the corresponding user and applies the set of notification rules and settings for the corresponding user. If an event occurs that matches a rule or setting for a user agent, interaction component 300 generates an appropriate notification message and sends the message to the user for which the user agent was provided. The message may be, for example, an email message, an instant message sent to the client being used by the user, or a wireless phone message.

In exemplary embodiments, account component 310 can be implemented to allow for a user to set access rights for other users with respect to particular argument representations maintained in argument data store 510. For example, account component 310 may allow a user to specify access rights for argument representations for which the user initiated construction of via argument presenter 200 or for argument representations for which the user has otherwise been provided with rights for setting access rights of other users with respect thereto. Account component 310 may also be implemented to allow a user to submit a request that specifies one or more other users, for example, either by typing an identification for the other users into a text box or selecting an identification for the other users from a drop-down list in common user interface 34, that the user wishes to invite to collaborate or otherwise interact with a particular argument representation within the collaborative environment implemented by interaction component 300 by accessing the Darbitrage platform via their client systems. In response to such a request, interaction component 300 may, for example, generate an appropriate notification message and send the message to each of the specified users. In exemplary embodiments, the request from the user, and consequently the generated notification message, may specify that the particular interaction that is the subject of the invitation will be conducted with respect to particular functionality offered by one or more of asynchronous collaboration component 320, a synchronous collaboration component 330, and a gameplay component 340, as well as specify certain limits on the interaction such as date and time ranges.

Figure 10:
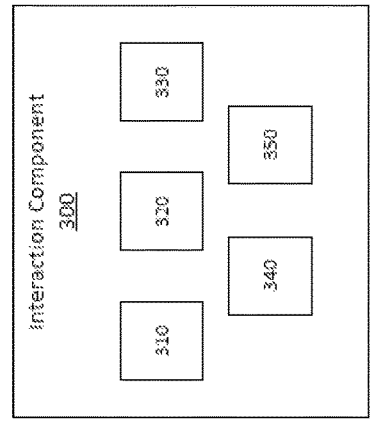
FIG. 10 is a schematic diagram illustrating an argument arbiter component of the exemplary distributed processing system provided in FIG. 7.

FIG. 10 illustrates an exemplary embodiment the components of argument arbiter 400. As shown in FIG. 10, argument arbiter 400 includes input processor 410 that handles requests and other communications that are transmitted to various components of the argument arbiter from other components implemented within system 10 as well as communications conducted by the argument arbiter over network 60, an arbiter review component 420 communicatively coupled to the input processor for processing requests to have various tasks manually conducted by a user having arbiter rights within system 10 through operation of arbiter client application 52 and for providing functionality for allowing such a user to perform the requested task over network 60 via arbiter user interface 54, an automated argument analyzer 430 communicatively coupled to the input processor for processing requests to have various tasks automatically conducted, and an automated review component 440 configured to monitor and mine overall system data and perform various maintenance tasks on the overall system data, and a local memory unit 450.

In general, as described herein, exemplary embodiments of the present invention relate to mechanisms for improving content by allowing one or more reviewers to edit, supplement and/or rebut components of the content, thereby improving the content. In exemplary embodiments, the content is streamed live to the public and the content is analyzed and improved using an innovative combination of computer-based tools to enhance the informative value of the content to the public. In exemplary embodiments, the content is otherwise provided to the general public or identified multiple individuals such as subscribers. In exemplary embodiments, the content analyzed is published as a text-based publication, television or other video content, and/or radio or other audio content. Exemplary embodiment can be implemented to provide for content to be analyzed using automated natural language processing to identify its elements (e.g., facts, opinions, axioms, questions, conclusions, etc.).

Exemplary embodiments can be implemented to provide for the elements of the content to be formatted for display using a graphical representation (e.g., an argument tree) and parsed into different components (e.g., facts vs. opinions vs. conclusions) to facilitate public review and consumption of the information content. In exemplary embodiments, one or more reviewers can analyze the formatted content and revise it by inserting additional or rebuttal facts, or by making other modifications. Exemplary embodiments may provide for the reviewer to be registered, verified, certified, rated or otherwise identified or selected as reliable reviewers. Exemplary embodiments can provide a mechanism for content to be represented in a manner that is clearer to consumers and more accurate.

Exemplary embodiments can be implemented to provide and allow machine and/or human processing of each of various tasks (e.g., analyzing, parsing, editing, etc.). For example, according to one embodiment, the technological implementation includes a human performing the parsing of a given text, while in alternative embodiments the content is processed automatically according to a natural language model as discussed above. For example, in some situations, a user can identify a type of logical rule invoked, while, in other situations, this function is performed automatically using one or more computers. Other circumstances involves situations where the reviewers compose the fact elements that support, rebut or clarify a given argument and/or situations where elements are automatically suggested by argument constructor 220 or automated review component 440 from fact database 530, searched out by the reviewer, or otherwise supplied for an argument automatically by the system.

For example, as illustrated in FIG. 7, knowledge base 500 include fact database 530 that stores statement element objects that have each been created for respective individual information items. The element objects stored in fact database 530 can be utilized for various collaboration and interaction functions being performed using the components of interaction component 300 with respect to argument representations stored in argument data store 510 as well as for various functions performed by the components of argument arbiter 400. Exemplary embodiments include all manner of data management for controlling and defining access to the fact database from which supplemental, rebuttal or additional content may be retrieved for various purposes.

Exemplary embodiments implement functionality related to online game systems and methods involving the competitive analysis and editing of content. Such functionality may be implemented and provided by gameplay component 340. Example games can provide for situations in which one or more user players analyze content with the objective of improving the content by revising, editing, rebutting, or adding facts, etc. In one example, gaming participants can be rated on their ability to process more than one argument at a time.

Exemplary embodiments also include various authentication schemes for verifying users and content sources such as video, voice prints, trusted repositories, certificate authorities and other elements. The system can also implement a mechanism to authenticate its outcomes to external users. Exemplary embodiments can also be implemented to provide various suitable controls for bounding, filtering, sorting, hypothesizing, scoring and governing the disclosure, referencing, presentation and format of construction of argument representation and collaboration and interaction therewith. In examples, the chain of conclusions and dependencies may be re-envisioned based upon inputs from a certain person or group.

Embodiments can be implemented with particular mechanisms for handling any applicable area of subject matter where reasoning and fact positions are present: scientific, philosophical, political, legal, religious, historical, etc.

Embodiments can be implemented to provide multi-lingual support, context-sensitive definitions and augmentation overlays for the uninitiated, as well as other popularization tools that allow maximum possible participation in a given debate, while at the same time allowing experts to communicate in the shorthand of their craft. Additional embodiments can be implemented to provide language adaptations for culture and era so that conclusions are not lost to history, misplaced idioms or tribalism, etc. Additional embodiments include mechanisms for argument summaries in natural language that align and merge parallel threads grown around two different statements of the same premise.

Exemplary embodiments of the present invention are not bound to a particular user interface—visual, tactile, auditory, virtual environment, or machine/brain interfaces for processing argumentation are all envisioned herein. Present physical world examples include touchpads, computer screens/keyboards, microphones, headphones, etc.

Embodiments of this invention are not limited to any particular presentation format for sorting, connecting, scoring, or relating the interplay between persuasion elements (e.g., arguments, logic types, comments, conclusions, users, reviewers, etc.). Any suitable format capable of representing the multi-modal of the nature, properties, interplay and hierarchy of the exemplary system elements may be utilized. Embodiments are not limited to a particular code platform for user interaction or system operation. Any format familiar to those skilled in the art, capable of managing and displaying the multi-modal nature, rights, properties, interplay and hierarchy of various system elements, (e.g., API, native application, web site, servers, computer Graphical User Interface (GUI) etc.) may be utilized in exemplary embodiments. Embodiments are not limited to any particular location, venue, or time for users, reviewers or content source. Actions may be performed real-time or delayed, locally or deployed over the Internet, with live or static content.

FIG. 1 illustrates examples of aspects implemented within exemplary embodiments of the present invention. A general description of some of these aspects will now be provided below:

1. Content: For the purposes of this illustration, content in its pre-processed state may range from a simple statement to a full-length movie, as long as it has a propositional component. Referring to FIG. 1, a sample of this type of content is under the heading ("Content Sources (Marked)") starting with "Beginning early in the morning . . . "

2. Processing that takes the content from a raw unformatted state and prepares it for computer-assisted computer analysis. FIG. 1 shows two different approaches and steps involved in this processing. The first places markers within the raw content such that the specific location/proposition can be referenced (FIG. 1a). The second (FIG. 1b) selects the sentence or thought associated with the marker. Depending on the computing power available, this preparation could be performed automatically or by a user of a document processing component designed for this purpose. By the end of this process, the specific elements of interest within the raw source are selected, referenced, and thereby directly accessible via the markers.

3. Analysis is the process by which the particular proposition-based elements are understood to be part of logical chain of thought. In FIG. 1, this is illustrated by the parallel diagram that ties Fact, Fact, Fact, . . . Logical Operator, and Conclusion. In embodiments, such logical diagrams (whether assembled by the user or automatically by the system) will be made up of active figures that react to their relationship with each other according to their properties of their associated data elements as well as allow the user variously interact with the graphical logic element, the propositional summary, or supporting content source, which can be linked.

4. Critique represents the next phase in the figure even though as a process it can go on indefinitely because the system is an open system that is essentially recursive. Referring to FIG. 1b, the system or the user of the interface initiates a comment thread at one of the markers, and the process iterates to process, analyze, and potentially critique the new content as successive users or reviewers, analyze, and revise it.

5. Summary: In the present example, "summary" is more of a state at a point in time rather than a termination of a particular process, for as long there is an ongoing critique process, the respective associated state of the conclusion element at the base of the original source still has the possibility of changing. The strength of the active elements in the argument representation in a graphical user interface is thus that all of the components can be made to inter-relate: a conclusion to one piece of content can be used as a fact element in another piece of content, and the system can display cascading dependencies as one flow of thought builds upon another. Referring to FIG. 1, the logical structure 'tree' can continue to grow to the right as comments and revisions are placed on previous comments and revisions. Accordingly, in this example, the force of deduction by its very nature flows to the root (toward the left), as the logical consequences work their way down to the original referents. These chains of implications occur naturally in everyday discourse, but the benefit provided in this example is that the contingencies and interrelationships of facts, arguments and conclusions are made explicit. Such a graphical representation facilitates the understanding of the content as well as the analysis of the content and its underlying logic.

In exemplary embodiments, as discussed above, at least two pools of content elements are processed in system 10. One is the logical type, warrants, and the other is labeled as premise. However, there are a variety of forms of logic and argument ontologies, some of which vary by domain. The figures set forth in the present application have been simplified to show examples, not to instruct on all forms of logical processing, and not to limit the range of potential logical operators by focusing on propositional relationships such as consonance, deduction, analogy, etc. These serve to illustrate the function of the warrants in these examples for drawing conclusions or implications from respective associated states of the preceding premises serving as inputs. The number of these operators is finite and hence computer analysis is suitable for rendering deductive conclusions, especially on concrete matters such as time, place and other physical properties. That is, in exemplary embodiments, the system, having understood the preceding facts, could deduce for instance whether or not they represented a consistent sequence of events based on whether the chronology presented made sense. Other forms of reasoning or representation within the realm of argument modeling are also within the scope of the present invention.

For example, modifications to the elements of the argument model layer may, in turn, have logical consequences for other elements based on the structure of the argument model and relationships between the element that can result in further modifying of other elements in a cascading series changes, adjustments, and notifications. In exemplary embodiments, certain users and/or components implemented within Darbitrage platform 20 may be required to make a determination of whether to accept or reject a modification to the argument model layer or provided with an option to "back up" in logical chain of modification or edit elements so that a different modification is effected for the element, which may then cause further cascading of modifications.

In an alternative examples, the aspects described with respect to FIG. 1 may be applied to different content from two different sources. In various aspects, whether automatically or by the user, the system is designed to reduce statements to their fundament elements so that accurate logical diagramming and analysis can be performed on a data point by data point basis. Additional statement elements not explicitly stated in the text can be extracted based on the content of the relevant fact elements directly stated the text. In each step, whether automatically or by the user, the system is designed to reduce statements to their fundament elements so that accurate logical diagramming and analysis can be performed on a data point by data point basis. By addressing the discussion on a point by point basis of different content from different sources, the system/reviewer can, for example, recognize a point of agreement between the sources and generated a meaningful logic diagram based on the type properties associated with each element. A reviewer may edit the logical representation, using a computer-based interface, to make the arguments or content flow easier to understand and/or to make the content more authoritative. The editing may include rearranging the logic flow, deleting facts, adding rebutting or additional facts, changing or adding axioms or logic types and other iterations of the content to improve the argument. In the simplest form, premises (depicted as circles) and warrants (depicted as diamonds) are shown, although any suitable form other forms are illustration and classification are considered. Moreover, by rearranging the statements elements, the system/user is able to create new conclusions based on the supports within the original content. As can be envisioned, the new content generated by the method is clearer, more logical, and easier to understand.

In exemplary embodiments, virtually any content can be analyzed, dissected, categorized and transmitted into simpler graphical representations including argument trees to illustrate the logic flow of the content and facilitate its analysis, testing and modification. For instance, content from two different sources can be analyzed, broken down into logic flow components, and then reassembled, with various statement elements being added to or deleted from said content, and combined to generate new improved content corresponding to the original content from each source, as well as for the purpose of generating new content containing the now logically-structured content from the two or more sources. FIG. 3 illustrates an example of a tablet-based interface used by a reviewer on a touch surface for assembling the persuasion and relationship elements into a given flow of thought, with a log of the effect on the conclusion status/rating over time. In various embodiments, natural language processing (NLP) to augment human processing during each aspect.

In exemplary embodiments, arguments structures are built within a user interface by moving the argument elements into proximity with each other according to their logical connective properties. The overall of effect of a series of these types of activities on the dependent conclusions might be displayed either textually or graphically as the relative surety scoring of the original logic flow is mapped out over time. Any other suitable forms of value determination may be used. Without limiting the variety and usage of statement elements within a user interface, visual codes and styles of presentation or interaction, the user interface in exemplary embodiments can provide the statement elements in a form that is readily visible and deployable to the user, such as, for instance, by a drag and drop the statement elements may be moved out into the field of play and assembled into logical relationship structures as the user in FIG. 3 is doing with Fact 4. Example interfaces can have available a variety of additional interaction forms to accommodate the other searching, sorting, rating, editing, inputting managing etc. functions discussed and contemplated herein.

In exemplary embodiments, elements of contest and skill can transform argument construction and analysis into a game. In the FIG. 4 example, the user becomes a player seeking to build structures as fast possible with a given pool of fact elements and logic types. Providing a similar interface that displays the same field of play to an opponent creates a contest of ideas, as each player tries to foil the objectives of the other. Play may proceed sequentially or simultaneously. Sharing of the field of play with a cohort, but with a different fact-base, may be utilized in exemplary embodiments to make argument structuring a team exercise. Removing the source content and instead starting with a dependent conclusion pushes each player to assemble a supporting structure as quickly as possible. Alternatively, starting with no conclusion and a finite pool of logic elements turns the contest into a puzzle, with the player attempting to discover and assemble the relationships between the elements as quickly as possible. In each case, the system itself may be an aid, an instructor, a moderator, a hindrance or an opponent. In each case, players can be added or eliminated; they can collaborate or work individually. These examples are merely illustrative; other game types may be implemented in exemplary embodiments.

In various embodiments, many attributes may also be scored or rated, including speed, the number of conclusion overturns achieved, or the number lost (measured directly or by dependents); the highest surety rating achieved for a given conclusion; or the highest rating of a conclusion toppled, complexity or simplicity of structure, ratings as to the elements or types of elements used (such as element count or degree of difficult), team contribution, number and surety ratings of dependent conclusions, audience popularity, personal arsenal of pre-assembled structures, etc. In addition, online and offline notoriety, privileges, electronic or durable goods, or compensation may add motivation to the game.

Exemplary embodiments can be implemented to solve a critical implementation shortfall in the popular adoption of other logic systems—the lack of sufficient incentive for the volume of editorial work in an argumentation system. By adding gaming, exemplary embodiments can provide a future of multifold more trained and engaged users capable of handling work burdens required in argument analysis systems prior to a robust implementation of NLP. The progress of the game along with the representation can be visible to a select audience, and so perform a social good as well as provide entertainment.

In exemplary embodiments, the exercise of logical persuasion is like a game: there are multiple players, rules for granting requests and awarding points and one or more objectives. Preferably, players employ strategies and use tokens to measure the progress of the contest. Games can be real-time or they can be intermittent. Players can take turns or they can operate simultaneously. Players can be added or eliminated; they can collaborate or work individually. Most importantly, they can be scored. In this case, the metric or the path to win rests upon the quality of the argument—and that is demonstrated by how quickly it becomes unassailable.

Embodiments of the present invention may also include cases where the review/analysis is performed by more than one participant operating on a given thread at the same time or in an iterative, alternating fashion, such as a game or competition where two or more reviewers work to defend or to defeat a given premise by arranging elements from the factbase, logical operators and their interrelationship to a given argument thread.

Exemplary embodiments include all manners of user controls to manage permissions and/or ratings for participants, arbiters/reviewers, domain hosts, viewers, automated bots and the like. These permissions or ratings may contain systems for gauging the reputation of the given user or reviewer as to the quality of their contribution, their argumentation or their comments. Permissions or ratings may be increased or decreased based on behavior of the individual within the system, other electronic media, or external criteria. These ratings may also be visible to other users. Permissions or ratings may also be tied to the user's expertise within a given subject or their level of participation. The system may also allow users to control their experience such as personal profile of information to be disclosed, levels of contact, advertising rights, copyrights, etc.

Another aspect relates to methods and systems allowing for interactive processes. FIG. 3 illustrates an example of an ongoing interaction according to one embodiment. In exemplary embodiments, one or more reviewers at remote locations can review and analyze content using interactive tools to review, analyze, mark, label, retrieve or submit additional or rebuttable factors, modify argument trees and more. Such a system may comprise an analysis module to allow one or more users to utilize these tools to interact with the content. One or more users may be identified as "reviewers" or the like and allowed to revise, edit, supplement or otherwise rebut one or more portions of the content.

Figure 5:
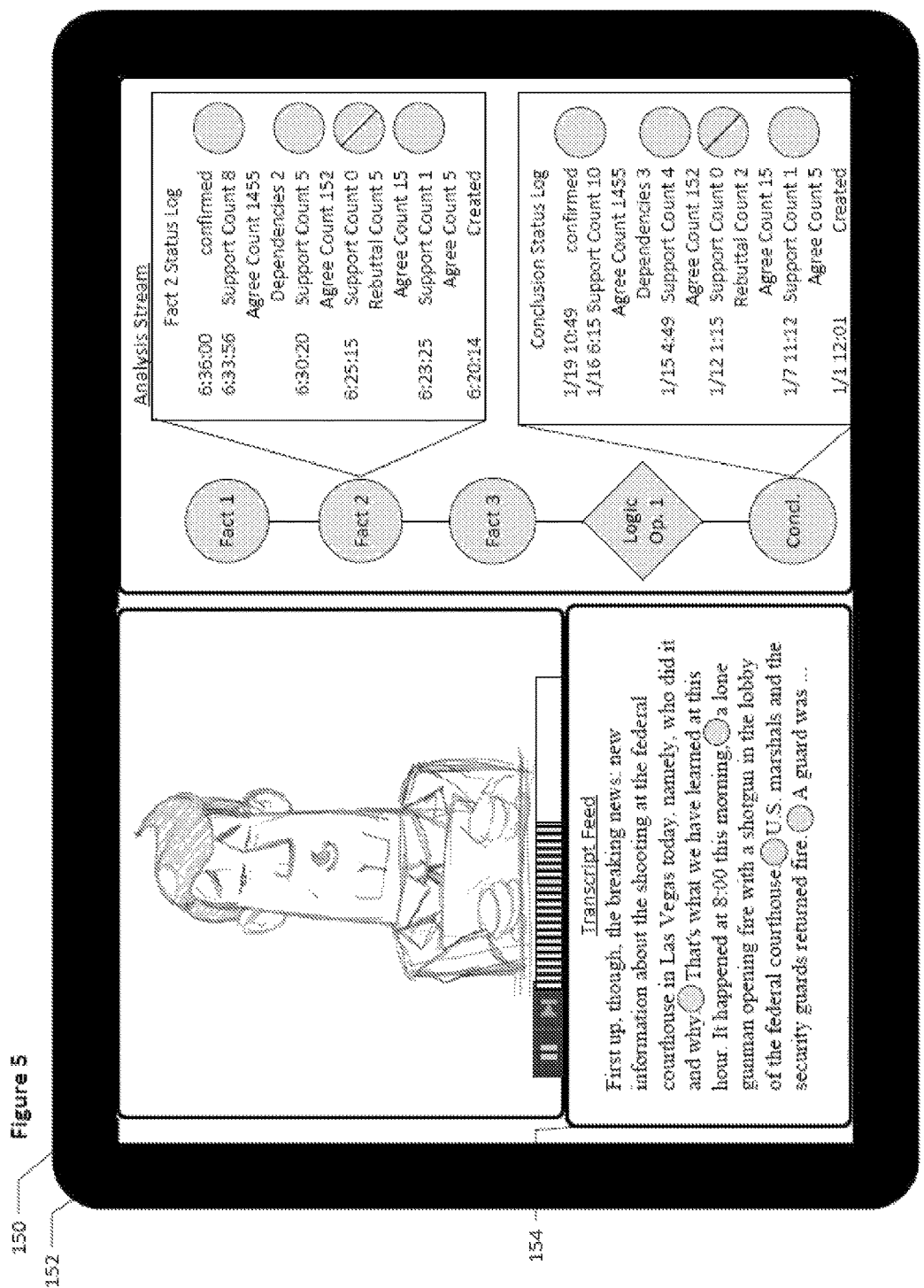
FIG. 5 is an illustration of an example of proposition-based content being generated and presented for review based on a streaming content within an annotated content layer view and constructed into a structured argument representation within an argument model layer view provided by a graphical user interface implemented in accordance with an exemplary embodiment of the present invention.

In embodiments, the user interface provides different interface elements and options depending on the content being reviewed, user rights, required levels of interaction or other criteria. In the example case of FIG. 5, there are three modules being displayed—a video player of queued or streaming content, a synchronized transcript of the session, and a synchronized status window of the interaction being performed on the content (which is similar to the status window 138 shown in FIG. 3). In one embodiment, the transcript allows users to mark the logical elements that have an interest in monitoring. In another embodiment, the markings are set by another user using an interface like the example shown in FIG. 1, or automatically by the system itself. In one example, the status window displays the real-time statistics of the particular logical elements undergoing a critique by the system or by another user with an interface such as depicted in FIG. 3 or FIG. 5. In another embodiment a reviewer processes and analyzes new content using an interface like that of FIG. 1 which facilitates the easy navigation between fact elements, related logical elements, and background content.

Users may subscribe to access and use the methods and systems of the invention. This may allow social media tools and functionality allowing subscribers to follow others users, content producers, subjects, or debates. Subscriber may be encouraged to view and consume diverse views and content and the system may be enabled to apply these user, demographic, or other filters to visualize and analyze the effect on an argument tree based on the exclusion of logical elements with certain properties—for instance to display only debate interactions and conclusion effects for those under 30. The foregoing has outlined some of the aspects of the present invention. These aspects should be construed strictly as illustrative of some of the more various features and applications that may be implemented within exemplary embodiments, rather than as limitations on the invention. Users may be rated/granted permissions based on past ratings, external credentials, relationship to highly related people on the system, levels of participation, levels of rebuttal, good community behavior, fee payment, etc. In exemplary embodiments, the user interface can be implemented to provide a robust set of tools for navigation between logical elements, threads, structures, score/ratings, interface modules, and sessions.

In exemplary embodiments, the factbase 530 contains all of the data elements that the user will use to support, rebut, or clarify prior arguments. The term factbase does not mean that everything with that designation has been itself proven, as almost everything in the system can be challenged, but it is the collection of statement elements that are available for use in argument construction. In general, most anything can be used within the fact base, hyperlinks, documents attachments, audio or video files, tables, charts, graphs, quotations from established sources, etc. Anything that can be cited within a computer system may be used. In exemplary embodiments, every content source will have a series of abstractions containing the source and different icons or representations that reflect and control the properties/behaviors of the particular item within the system. For example in FIG. 1, the entire article could be a fact element even though there are also fact elements identified within the article. In one case, a user would attach the single sentence element to the argument flow and the system would carry along the larger article behind that element for users who wanted to see the context of the excerpt. A similar methodology created around streaming content with the marker being a time or coding stamp to illustrate the sentence being referred to and the fact elements containing either the transcript or recording of the larger context. Other data properties of the fact elements are also in view, including for example time, date, audience, speaker, credentials, reputation, event location, circumstance etc.

Fact elements may be captured anywhere. Within a website, by clicking anywhere on a page. From a streaming media source by capturing a timestamp or coding marker or screenshot or audio sample, etc. Similarly from a live event, perhaps adding a location-based marker to the audio sample or a timestamp which references a third-party recording of the event. In the case of static off-line content, such as a book or article again referencing a particular location within the text, the context of which is available elsewhere in the system.

A simple methodology for each of the above follows, although other suitable implementations are considered. For a selection within a webpage in one example, representation could be provided as an overlay or a layer on the browser interface that records exactly where on the page relative to the text the user selected. From there the overlay could be implemented to automatically allow the user to select the immediately surrounding text that represented the fact element desired for capture. At this point the system could be implemented to capture other reference/location properties of the context such as the URL or server location the author, the date of publication, perhaps the article itself, and other metadata that might be useful for identifying and processing the citation. The end effect is that the single point on-screen selection that marks out a single fact element is now portable within the system, complete with its context and relevant properties. In another embodiment, the user makes a screen capture that uses only the storage server data location as its referent and the system performs optical character recognition to identify the fact element being captured and the context for the metadata.

In another embodiment, a similar functionality performed with off-line content allows a user to scan or take a picture of the page and also input key reference elements from the source (author, date, title, publication, etc.). The system then performs OCR to create a fact element for further manipulation. In the case of broadly published works, further context could be retrieved from online document repositories. In another embodiment, repositories of online documents add these markings to the display of the web information such that any future readers could see the exact location in the context at which an argument flow was started for processing within the system, similar to the placement of a footnote. Thus in-line markers and clickpaths to comments and rebuttals would be available to anyone that wanted to follow the flow of critique directly from the content based on which the interaction was generated.

In another embodiment the media stream includes a code that uniquely marks the time location of the content being broadcast and the user interface includes the ability to capture that code and then submit it back to a storage server which contains the whole of the stream for retrieval and reference as a part of a fact element in the system. In another embodiment, at a live event, the "code" referenced by the user for the purposes of marking the fact element is made up of such things as a time stamp, location stamp, audio sampling, etc. such that a user can uniquely identify a thought element within a larger content source. In another embodiment, the user captures the entire audio or visual stream themselves and uploads it to the system for transcription and marking as above. In a similar methodology, a user may encode or reference a capture from an off-line written source, where the unique reference code is an author, title, page, publication date etc. which allows the system to pull it from a common repository. In another embodiment, such as a private letter, where the content is not readily available, the user may upload or input the entire content itself. In cases where there is content or content references brought into the system, the system may examine the entirety of the source content for the purposes of identifying and displaying the other fact elements and conclusion flows of the material.

Embodiments of this invention can be implemented to allow processing of the subject content and marking of all types of ideation content: text, speech, video, images and sensor or machine generated data. Even material which would seem to resist parsing, such as a table of data or a picture, can be submitted as part of the fact base but and also opened to marking and comments within the system in certain exemplary embodiments. In embodiments, a speaker speaking into a microphone has his speech converted to text, which is then automatically parsed, diagramed and critiqued or buttressed within the system in preparation for the summary rating on the key points of the speech. This may be achieved with minimal human oversight using one or more computers. In transition to that computing intensive stage, humans and machines may service or augment each step of this process creating inter-relationships and conclusions from content sources.

In exemplary embodiments, once a statement element has been created within the system either automatically or by a user, tools implemented within the system may screen, manage, and control these statement elements and their usage within argumentation processes. For instance, even before statement elements may be made available for arguments, the statement elements may contain properties to interface with database credentials such that statement elements that derive from content at trusted repositories shall receive higher treatment within the system then ones that do not, and statement elements for content that is drawn from more broadly distributed sources shall receive lesser treatment than those that do not. Statement elements that are based upon sources that are harder to imitate shall receive superior treatment than those that do not. For example, should a subversive user wish to fake certain content, video and audio of a famous speaker would be harder to create than just audio alone or just attributed text. In one example, the system can be implemented to increase or decrease the persuasive strength assigned to statement elements according to these and other types of credentialing attributes. The facts may also be stored in secured databases to reduce tampering.

In exemplary embodiments, the certainty rating of a given claim and the associated statement elements in a given argument can be adjusted based on the changing credentialing status of the supporting statement elements. Similar ratings adjustments may also be made based on changes in the credentialing attributes of the user.

In exemplary embodiments, the system can be implemented to provide controls around the portion of the factbase available for an argument, for example, to allow only facts from a given repository, a given author, a given category or topic, a given date range or location, etc. In this way the system may support models for revenue, for privileges within the system, for topic boundaries for discussion, for evidence pools, etc. In one embodiment, the only content source allowed may be the past content from the speaker themselves, and thereby in a fully supported NLP architecture, will literally enable modeling of argument directly between the speakers themselves. Various other advantages may be provided via this toolset.

In exemplary embodiments, the methods and systems employ an "honesty mode" or similar functionality where the system analyzes content for statements presently being made by a speaker in comparison with all content that has been generated for statements previously made by the speaker and generates a report based on this analysis for the audience that indicates a level of personal consistency for the speaker. This analysis could be assisted within the system by user reviewers or performed automatically with NLP. In one example, the only available statement elements from factbase 530 for use in analyzing statements presently being made by a speaker is a particular data store of previous statements by the speaker.

In embodiments, the content brought into the system or the statement elements made available for performing argument arbitration may be retrieved and suggested to the reviewer automatically. This selection could be based on common words, topics, authorship, location/time of events or a myriad of other suitable criteria for performing search queries. The design of the system may empower the arbiter to have the most relevant statement elements easily available for performing dabitrage and that any such statement elements would already have collected the proper context and properties needed for usage with in an argument flow.

Embodiments of the present invention also include situations where the available statement elements are a narrow selection of facts from a factbase, or a selection filtered by such things as a given source or a rating within the system, or the pool may be left completely open for any citation or statement. The factbase may also include conclusions from elsewhere in the system, although naturally this does create dependencies within the subsequent conclusions. The factbase may also include elements which are anecdotal or subjective according as the rules and surety ratings are configured by the thread domain administrator. The size, type, quality, availability may also be based on the fee schedule for the user, domain expertise, pre-debate agreements or evidence certification.

In an example application, the capture, processing analysis or critique of content is done on a deployed mobile device so as to utilize location aware functionality. For example a user running a mobile application for content capture could in real-time record and possibly transcribe the broadcast from a live event, inserting place markings into the stream while it went on using a button on the application—much as shown in the transcription functionality depicted in FIG. 5. Even without the transcription, the timestamps or immediate audio sampling could be used for the reviewer to position future remarks. In another embodiment the timestamp or the audio sampling is used as a reference for subsequently requesting the entirety of the content from a storage database for processing within the system.

In another example, location elements and time elements are used as a reference key to select the broadcast stream going on at that time and location. For instance, the GPS and time of day could be used to reference recorded content that was occurring at given venue at that time. For the purpose of such an example, location information might be any sensor or keyed information that would reference the unique location-event, such as GPS, cell-tower, EMF signaling or radiation, pictures of landmarks or other fixed location objects, audio, or other unique signature environmental elements. Any unique data referent which is able to be matched as a reference key to access the broadcast files kept in a data store is considered regardless of whether a common timestamp is available. For instance, a recording sample of a live public event could be used to establish both time and location from those known attributes about the event. In another example, the location reference may be relative to another mobile element, such as sensor that records the proximity of a famous speaker's cell phone or the presence of a picture of a speaker at given time of day.

Exemplary embodiments can be implemented to enable a user to mark a logical element within in a stream, such as during a press conference, construct a logic tree that represents the logical structure of the discussion pertaining to a question at the event, and then place the speaker's answer as new piece(s) of fact/operator content in relationship to the structure representing the question. Exemplary embodiments can also be implemented to enable the users to perform interaction on the streaming content.

In another example, embodiments can be implemented to enable a user running a client application on his mobile device during a broadcast event to mark a time stamp and location using a LBS (location based services) and proceed to use that LBS coding alone or with an audio or visual sampling from the broadcast stream (whether live or remote (e.g., TV or other video)) to mark the point at which a reviewer could start a thread.

In another embodiment, the system receives a stream of private audio, visual, or sensor information from a mobile device or microphone and the content feed is processed or analyzed remotely in the system by a third party using available content from a select factbase.

In one embodiment, the marker then triggers the system to start an interaction flow at exactly that point, and the debate and/or interaction ensues based on the content generated. In one application, social connections and/or functionality as well as techniques for marking location-events is provided similar to that described in U.S. patent application Ser. No. 12/285,689 filed Oct. 10, 2008 and published as U.S. Patent Application Pub. No. 2009/0117883, the content of which is hereby incorporated by reference thereto in its entirety.

Exemplary embodiments relate to mechanisms for integrating location-based technologies with the various methodologies described herein. Exemplary embodiments of the present invention relate to a computer-based method that comprises receiving content submitted by a user via a mobile device including time and location of submission in which the content comprised of one or more statements of facts and one or more statements of opinion claiming partial or total derivation from the one or more statements of fact, receiving review requests from one or more reviewers to classify some or all of the content into a set of fact statement elements and a set of opinion statement elements, and to delete one or more of the fact statement elements, and granting the review requests to one or more of said reviewers. In exemplary embodiments, the method can further comprise automatically revising the set of opinion statement elements by deleting opinion statement elements claiming partial or total derivation from deleted fact statement elements. In exemplary embodiments, the receiving step can further comprise receiving requests from one or more reviewers to add to the content one or more new facts, opinions, or conclusions claiming partial or total derivation from prior facts, opinions, or conclusions in the content. In exemplary embodiments, the method can further comprise automatically revising the content by adding said new facts, opinions, or conclusions specified by reviewers whose requests were granted.

Exemplary embodiments relate to mechanisms that can be utilized during a live action debate. For instance, exemplary embodiments can be implemented to enable two or more parties take turns presenting their arguments, rationales, facts and details. Meanwhile, the system would capture, transcribe, and process while one or more users or reviewers analyzes the contents of what is being spoken and arranges the associated logical structures, facts comments, etc. to support or diminish the arguments. In one example, one or more reviewers may access and interact with a structured argument model representation as in FIG. 3 or two or more users may operate the service on an interface such as that depicted in FIG. 4, while the audience looks on and watches the progress or ratings. In one example, the interaction flow is visible to the participants and to the audience, which can thereby aid in improving the quality of the speech on an alternative view-only display of the modules in FIG. 5. In one application, portions of the interaction functions are projected on a large enough screen for audience viewing. In one application, the progress of the debate along with the interaction would be visible to a select audience.

According to another exemplary embodiment, the argument interaction is performed based textual information extracted from a printed document, wherein a single user is able to reference any given segment of text on such a document for initiating review and analysis within the system for a particular point being made in the text of the document by capturing an image of the relevant section (for example, using a camera) and uploading the image as a retrieval reference for accessing the entire article or content from a data store. In one example, an image could also be taken and used to capture the content publication information for ease of reference from the data store or simply to feed relevant context property fields within the corresponding statement element objects for statement elements constructed based on the content via a scanning technology such as OCR (Optical Character Recognition). In another example, an image of the entire content is captured, uploaded, and processed via OCR in order to populate it as a textual content source within the system. In another example, a user can utilize a pointer device during the capture so as to mark the location in the content of a segment for which construction of a logical argument structure should be based once the textual content has been captured. In one example, the captured content can be visible within the user interface for performing further interaction.

In further exemplary embodiments, whole books, studies, articles, and newspapers are fed into the system for digestion, parsing, and critique, and the system can be implemented to provide for review of static content wherein a book, article, or recording may be reviewed/parsed/diagramed for its own internal consistency, related to other works/statements of the same author and in one application, and/or merged with arguments generated based or content from other content sources.

Exemplary embodiments can be implemented to enable one or more reviewers or editors to combine or weave together two or more argument trees to generate a graphical representation of multiple related items of content. For example, content from multiple sources can be analyzed, parsed, and organized and then combined to generate new content containing improved logic flows.

In other embodiments, the ontology of available premises and warrant statement elements is expanded to include other types of interactive elements with their own unique properties, such as, for example, questions, hypotheticals, contingencies, alternatives, intangibles etc. The present descriptions are for illustrative purposes only and are not intended to be limiting for implementations scenarios in which various mechanisms could serve a similar purpose or for the present invention in general.

In exemplary embodiments, the system can be implemented to assist in resolving domestic or neighborly disputes by allowing both parties to work out their differences within the rule-base of the logical elements or system, either by themselves or with the assistance of a reviewer trained in dispute resolution.

In another embodiment, the system can be configured to provide argument types for assisting with tasks performed by those in the legal profession—judge, jury, lawyer, stenographer—in one application using real-time recording of legal proceedings and content, alignment allowing a judge or jury to only review the conclusions and underlying basis that are available for all to view. In another example, the system can be configured to provide argument types according to the special domain knowledge required within academic or scientific environments. In another example, the system can be configured to provide argument types for use in conjunction for committees and legislative bodies that are regularly speaking and deliberating on the record. In one example, elected politicians or officials are provided with tools to analyze, review, and rebut an opponent's speeches or content. According to another example, one or more members of the press or public are the reviewers and the results are published to shine light on the speeches, etc. According to another example, the methodologies are integrated with broadcasts by CSPAN or other government access channels or news channels as a tool to help the public better understand the content, for instance, in a streaming model similar to FIG. 5.

One example of content containing argumentation components that may benefit in exemplary embodiments would include one or more conclusions derived from one or more facts, where one or more of said facts are determined to be erroneous or defective based on rebuttal or additional facts identified. Negating one or more of the facts would negate or modify the conclusion, thereby clarifying or correcting the content.

Another example would include one or more conclusions not supported or fully derived from the one or more facts. For example, content that arrives at the conclusion using a "leap of faith" to arrive at the conclusion. That is, the set of facts included in the content does not result in the conclusion provided. Pursuant to this example, the flaws would be identified and rebutted by demonstrating, for example, the rebutting or alternative conclusions that can be derived from the facts provided to support the conclusion The alternative conclusions may be added to the content with the alternative logic flow to demonstrate the flaws in the original logic flow.

In examples such as the one provided in FIGS. 2a-2c, the system can be implemented to allow content to be parsed, analyzed, tested, verified and otherwise improved using analytical techniques and computer-based processes. Some or all facts, opinions, or conclusions in content may be classified as affirmation data, argument data, and axioms. Reviewers may further classify some or all facts, opinions, or conclusions in said content using a computer-implemented or computer-assisted method that identifies the relationship of the fact data as supporting, rebutting, or clarifying the conclusions. In exemplary embodiments, content may further comprise probabilistic, statistical, or other measures of strength of conclusions in said content, and weakening of conclusions is reflected by a reduction in said measures of strength.

Exemplary embodiments relate to methods for improving content by receiving requests from one or more reviewers to edit, supplement and/or rebut components of the content thereby improving the content. Arguments may analyzed, disassembled, tested and reassembled, preferably with the addition of one or more rebutting or supportive facts that generate new or improved conclusions and content.

Exemplary embodiments relate to a computer-based or computer-assisted method for analyzing content comprised of one or more facts and/or opinions, and one or more conclusions claiming derivation from said facts or opinions, received from a static or live streaming content source, comprising receiving review requests from one or more reviewers to classify some or all of said content into fact components and/or opinion components and/or conclusion components, and to add delete one or more facts or opinions or conclusions from said content, and granting said review requests to one or more of said reviewers.

Exemplary embodiments relate to methods and systems utilizing the following components to result in synergies: 1. A content source which communicates and draws conclusions and/or otherwise provides the content to be reviewed and analyzed. 2. A marking tool or module that allows a reviewer to comment or edit or otherwise interact with any of the specific affirmations, axioms, or conclusions or a parsing mechanism to identify them within the content. 3. A flow engine to diagram how the affirmations, axioms, or conclusions build or assemble to support the conclusion(s) with a categorization tool that identifies the relationship such as supporting, rebutting or clarifying and identifying the logical or persuasion rule(s) involved, i.e. non-contradiction, sequence inversion, causality, deduction, opinion bias, mutual exclusion, etc. 4. A rating system by which other reviewers can review or comment on the work of an earlier reviewer with similar parsing (2), marking (3), categorization (4), and persuasion rule identification (4) as described above. 5. A summary presentation that represents to an audience how effectively the original content survived the critique of the reviewers, and also how effectively the individual threads of the reviewers survived each other, such as a representation in cascading effect and argument threads and how the facts and conclusions interrelate.

Exemplary embodiments relate to a method that comprises receiving a stream of content including one or more assertions including one or more facts, organizing the components of the content including the assertions by affixing them into the graphical representation of the content including an argument tree illustrating the relationship of the components to each other; and defining the nature of the connection between the components (for example, supporting, rebutting, or clarifying). In examples, the method further comprises allowing users to improve the statement of the thread premise, by encapsulation, or promotion of a given contribution to the head. For example, the statement "the Louisiana purchase was constitutional" could be stated any number of ways within a larger paragraph, however eventually all of these variations would be subsumed (manually or automatically) under the 'binary' assertion. A debate may start about the definition of 'constitutional,' so the premise could be further refined. In examples, the method further comprises appending additional evidence elements to the assertions and measuring the quality of the reviewer.

In exemplary embodiments, content producers can submit content to the system for construction of an argument, allow critics/arbiters to challenge the content, and then defend the content within the system. Exemplary embodiment can further comprise receiving requests from one or more reviewers to edit or delete one or more fact or opinions and automatically generate a modified logical argument representation indicating said edits or deletions.

Exemplary embodiments can leverage natural language understanding (NLU) or NLP with a graphical user interface and analytic processes and tools to allow for the improved processing of content. Exemplary embodiments relate to a user interface illustrating content, along with reviewer requests, pursuant to any of the aspects described above. Exemplary embodiments may also implement algorithms to tabulate degrees of surety surrounding a conclusion such as the number of independent threads that deduce to it, the quality of the reviewers within the system, the dependency on argument threads/conclusions which fall short of being unassailable, etc.

Exemplary embodiments relate to a method that comprises displaying, on a user interface, said content containing fact data and initial conclusion data, said initial conclusion data based on said fact data; displaying, on said user interface, one or more classification designations of said content as fact data or conclusion data; and, in response to said classified fact data and conclusion data, automatically generating additional facts or rebuttal facts related to said fact data or said conclusion data using at least one computerized device operatively connected to said user interface. Exemplary embodiments may further comprise automatically generating changes to said content related to said additional facts or rebuttal facts using said at least one computerized device. Exemplary embodiments may further comprise receiving requests to delete or edit or classify said fact data or conclusion data from said at least one user through said user interface. Exemplary embodiments may further comprise, in response to said requests, automatically generating changes to said fact data or said conclusion data by referring to fact data sources within said at least one computerized storage medium using said at least one computerized device. Exemplary embodiments may further comprise automatically calculating confidence measures of each of said fact data using said at least one computerized device. Exemplary embodiments may further comprise generating a flow diagram of said content representing the relationship between said fact data and conclusion data. Exemplary embodiments may further comprise displaying said fact data, initial conclusion data, said requests and said confidence measures on said user interface.

Exemplary embodiments relate to a method for automated analysis of content comprised of one or more facts and/or opinions, and one or more conclusions claiming derivation from said facts or opinions, received from a static or live streaming content source and generation of a content report based on said content, that comprises detecting and classifying at least one fact or opinion and at least one conclusion claiming derivation from said fact or opinion; isolating specific facts or opinions regarding the at least one conclusion; and generating at least one graphical flow diagram based on at least one predefined format displaying the relationship between said fact or opinion and said at least one conclusion.

Exemplary embodiments relate to an automated method for analysis of content using an argument tree that comprises generating an argument tree representing relationships between a plurality of facts or opinions and at least one conclusion data, wherein the argument tree comprises a plurality of nodes and a plurality of lines connecting the nodes, wherein each node is associated with a specific fact, opinion, or conclusion, and a line represents a conditional dependency between conclusion and fact or opinion; generating additional facts or opinions and/or rebuttal facts or opinions relating said facts or opinions to said conclusion data; associating said additional facts or opinions and/or rebuttal facts or opinions relating said facts or opinions to said conclusion data and modifying said argument tree as a result of additional facts or opinions and/or rebuttal facts or opinions; and providing to a user, via a graphical user interface, said argument tree including modifications thereof. In examples, the method further comprises receiving from the user, via the graphical user interface, requests to edit said facts, opinions conclusions, or argument tree.

Exemplary embodiments relate to a computer-based method for determining basic argument components and structures for natural language word strings that comprises inputting a string consisting of a plurality of words forming a linguistic expression in a natural language including one or more facts or opinions and one or more conclusions; parsing the input string with a syntactic set of rules to derive a syntactic structure for the string, identifying facts and/or opinions and conclusions within said string; and generating a flow diagram of said string representing the relationship between said facts or opinions and said conclusion. In examples, the method further comprises retrieving additional facts and/or opinions and/or rebuttal facts and/or opinions and modifying said flow diagram as a result of said additions. Exemplary embodiments relate to a method of using a computer to automatically process content containing text to analyze and evaluate conclusion data within said content that comprises automatically classifying portions of said content as facts, opinions, or conclusions; identifying the relationship of said facts, opinions, and/or conclusions; and generating a flow diagram of said string representing the relationship between said fact and/or opinions data and said conclusion.

Embodiments may also involve the review of streaming content wherein a speaker or broadcast is reviewed/parsed/diagramed for its own internal consistency, then related to other works/statements of the author and then meshed with the flow diagrams of other sources. Exemplary embodiments relate to a method of operating a streaming content system that comprises receiving streaming content at a user device which includes a channel selector; displaying the received content at the user device; selecting a channel using the channel selector; establishing a direct connection between the channel selector; and allowing one or more users to perform interaction on the content. In examples, the interaction is performed simultaneously with the streaming of the content. In examples, the interaction modifies or supplements the content generating modified content and said modified content is viewable by other users.

Exemplary embodiments relate to a computer readable storage medium having a computer program stored thereon, the computer program being executable to provide a system that comprises a program module configured to receive streaming content at a user device which includes a channel selector; a program module configured to display the received streaming content at the user device; and a module configured to allow one or more users to perform interaction on the content.

Embodiments may also include any and all business methods for generating revenue and income through the sales of software and services that include one or more embodiments of the invention described herein. Example embodiments include (a) selling or licensing software for use on existing hardware platforms to enable the invention; (b) charging users on an annual, monthly or per-component basis for use of the service/invention; (c) charging based on the expertise of the reviewer or based on other particular capabilities of the service. Users of the service (i.e. users, reviewers, or content sources) may include individuals, businesses, not-for-profit organizations, advertisers, political action groups, media organizations, arbitration societies, civic authorities, or any other organization.

Exemplary embodiments relate to online games involving the competitive analysis and editing of content. Exemplary embodiments relate to a computer-based game implementing any suitable aspects described above, and further comprising granting said review requests to at least a first contestant and a second contestant; calculating award points for said first contestant and said second contestant based on said granted requests; and awarding said first contestant or said second contestant based said calculated award points. In embodiments, the method can further comprise generating a flow diagram of said content representing the relationship between said fact data and conclusion data and revising said flow diagram as said first user and said second user submit edits or deletions. In examples, the flow diagram is revised live during said game. In one example, the first contestant and said second contestant can search and submit rebuttal facts from one or more digital libraries. In some embodiments, the content can be randomly selected or semi-randomly selected. In some embodiments, the content is selected by the first contestant and/or second contestant. In some embodiments, the content relates to a topic selected by the first contestant and/or second contestant. Exemplary embodiments can further comprise informing other users of said awarding of said first contestant or said second contestant. For example, the step of informing other users of the awarding includes sending a message to the other users which may be displayed on a further interface for the multiplayer online game or transmitted electronically to the other users, for example, through one or more selected from the group consisting of: electronic mail, a web log, a microblog, and Short Message Service (SMS). In one example, the operation of informing other users of the awarding includes aggregating information about the award with information about other awards.

Exemplary embodiments relate to a computer based game implemented by at least one computer that involves allowing at least a first contestant and a second contest to review and analyze content; receiving requests from said first contestant and said second contestant to edit or delete or supplement said content; granting said review requests to one or more of said reviewers; calculating award points for said first contestant and said second contestant based on said requests; and awarding said first contestant or said second contestant based said calculated award points.

Exemplary embodiments relate to a computer-based method for conducting a game that comprises receiving content from a first player and/or a second player, said content containing facts or opinions and one or more initial conclusions; receiving, by way of a computer, requests from said first user and said second user to edit or delete or replace said fact data and conclusion data; calculating award points for said first user and said second user based on said requests; and awarding said first player or said second player based said calculated award points.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 6:
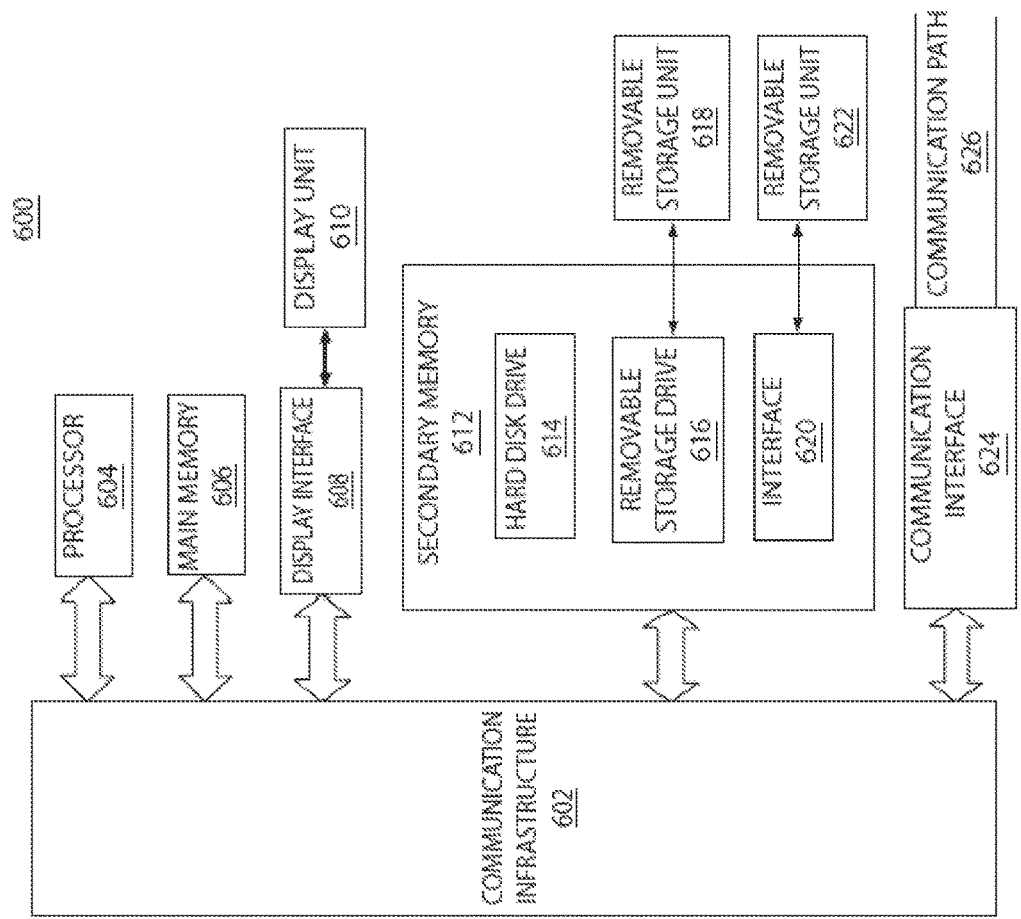
FIG. 6 is a block diagram of an exemplary computer system that may be utilized within exemplary embodiments of the present invention.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

While the invention has been described in detail with reference to exemplary embodiments, it will be understood by those skilled in the art that various changes and alternations may be made and equivalents may be substituted for elements thereof without departing from the scope of the invention as defined by the appended claims. In addition, many modifications may be made to adapt a particular application or material to the teachings of the invention without departing from the essential scope thereof.

Variations described for exemplary embodiments of the present invention can be realized in any combination desirable for each particular application. Thus particular limitations, and/or embodiment enhancements described herein, which may have particular limitations need be implemented in methods, systems, and/or apparatuses including one or more concepts describe with relation to exemplary embodiments of the present invention.

Therefore, it is intended that the invention not be limited to the particular embodiments disclosed as the best mode contemplated for carrying out this invention, but that the invention will include all embodiments falling within the scope of the present application as set forth in the following claims, wherein reference to an element in the singular, such as by use of the article "a" or "an" is not intended to mean "one and only one" unless specifically so stated, but rather "one or more." Moreover, no claim element is to be construed under the provisions of 35 U.S.C. § 112, sixth paragraph, unless the element is expressly recited using the phrase "means for" or "step for." These following claims should be construed to maintain the proper protection for the present invention.

What is claimed is:

1. A method for providing proposition-based content for review within a collaborative on-line environment, the method comprising:

retrieving base vocabulary elements maintained in an ontology data store having a tree structure that imposes one or more restrictions on representations of argument components and any relations there between, the base vocabulary elements in the ontology data store including a plurality of claims represented as a root in the tree structure and encompassing a statement of conclusions for which other statements are provided as support to indicate truth thereof, premises representative of the truth of a claim and represented as nodes in the tree structure, and warrants setting forth logical rules and represented as edges in the tree structure, wherein the edges connect the claims and the premises;

creating a structural representation of the retrieved base vocabulary elements whereby the structural representation can be delivered over communications to one or more users such that a set of propositional content available for a first argument may be visually displayed to the one or more users in an on-line collaborative environment as a plurality of statement elements within a user interface at one or more client systems utilized by the one or more users, each of the statement elements being one of a plurality of statement types including premise, warrant, and claim, each of the statement elements having a respective associated state;

constructing a logical argument object for the first argument responsive to a first set of input received from a user from the one or more users, the first set of input defining the first argument according to a specified argument type to include one or more premises and one or more warrants of the statement elements, a first claim of the statement elements, and a plurality of interconnections defining logical relations between the one or more premises, the one or more warrants, and the first claim according to respective logical rules for the one or more warrants such that the respective associated state of the first claim is dependent upon the respective associated states of the one or more premises and the one or more warrants and the logical relations defined by the interconnections of the first argument;

executing instructions stored in memory by way of a processing device whereby the logical argument object for the first argument is analyzed thus the respective associated state of the first claim based on the respective associated states of the one or more premises and the one or more warrants and the logical relations defined by the interconnections in the first argument; and generating a structured argument model representation of the logical argument object for the first argument;

transmitting the structured argument model representation to the one or more users in the on-line collaborative environment whereby the structured argument model representation is visually displayed to the one or more users in the on-line collaborative environment to provide an indication of each of the one or more premises, the one or more warrants, the first claim, the interconnections between the one or more premises, the one or more warrants, and the first claim, and the respective associated state of each of the one or more premises, the one or more warrants, and the first claim; and updating the tree structure of the ontology data store and any restrictions on the representations of argument components and any relations there between as a result of interaction with the logical argument object and structured argument model by the one or more users.

2. The method of claim 1, wherein each of the plurality of statement elements is represented within the user interface based on a corresponding statement data object stored for the statement element, the corresponding statement data object for each statement element including a plurality of data fields including a statement type field holding data indicating the statement type of the statement element, a proposition field holding data indicating an underlying proposition represented by the statement element, and an associated state field holding data indicating the respective associated state, and wherein the respective associated state is a value associated with the underlying proposition represented by the statement element.

3. The method of claim 2, wherein, in the corresponding statement data object for each statement element for which the statement type is premise or claim, the data that is held in the proposition field of the statement object for indicating the underlying proposition represented by the statement element is textual content, wherein, in the corresponding statement data object for each statement element for which the statement type is warrant, the data that is held in the proposition field of the statement object for indicating the underlying proposition represented by the statement element is an indication of the respective logical rule for the statement element, and wherein the respective logical rule for each statement element for which the statement type is warrant is defined in terms of a corresponding logical operation that is performed to generate an output value based on one or more input values.

4. The method of claim 2, further comprising receiving the corresponding statement data objects for at least some of the plurality of statement elements from the ontology data store within which a plurality of predefined statement data objects are stored.

5. The method of claim 2, further comprising constructing the corresponding statement data object for each of at least some of the plurality of statement elements based on input provided from at least one of the one or more users via the user interface provided through the one or more client systems for defining the corresponding statement data object.

6. The method of claim 5, wherein the user interface is provided as a graphical user interface (GUI), further comprising receiving a textual content and displaying the textual content via a textual content window of the GUI, and wherein the input provided from the at least one of the one or more users for defining the corresponding statement data object for each of the at least some of the plurality of statement elements is provided via user interaction with corresponding portions of the textual content displayed within the textual content window using interface elements of the GUI.

7. The method of claim 6, further comprising constructing and storing an annotated content object for the textual content having a respective association between the corresponding statement data object for each statement element defined via user interaction with a corresponding portion of the textual content displayed within the textual content window and the corresponding portion of the textual content, wherein the textual content is displayed within the textual content window with a marking indicating the respective association for each corresponding portion of the textual content, and wherein each statement element defined via user interaction with a corresponding portion of the textual content displayed within the textual content window is accessible within the GUI via user interaction with the corresponding portion of the textual content displayed within the textual content window.

8. The method of claim 7, wherein, for each statement element defined via user interaction with a respective corresponding portion of the textual content displayed within the textual content window that is included within the first argument, a corresponding section of the structured argument model representation of the logical argument object for the first argument that includes the statement element is accessible within the GUI via user interaction with the corresponding portion of the textual content displayed within the textual content window.

9. The method of claim 7, wherein, for each statement element defined via user interaction with respective corresponding portions of the textual content displayed within the textual content window, a corresponding content field of the corresponding statement data object for the statement element holds a reference to the corresponding portion of the textual content, and the corresponding portion of the textual content displayed within the textual content window is accessible within the GUI via user interaction with the statement element.

10. The method of claim 6, wherein receiving the textual content includes receiving a reference to an electronic document and an indication of at least a portion of text included within the electronic document from the at least one of the one or more users via the user interface provided through the one or more client systems, and retrieving a copy of the at least a portion of text included within the electronic document according to the reference.

11. The method of claim 10, further comprising updating the electronic document to include a respective association between the corresponding statement data object for each statement element defined via user interaction with a corresponding portion of the textual content displayed within the textual content window and the corresponding portion of the textual content within the electronic document.

12. The method of claim 2, further comprising receiving a textual content, performing an automatic analysis of the textual content syntactically and semantically according to a natural language model defined for the specified argument type to identify each portion of the textual content that corresponds to one or more of the plurality of statement types, and constructing a corresponding statement data object representing at least one statement element derived from each identified portion of the textual content based on the analysis and the corresponding statement type for the identified portion of the textual content, and wherein each statement element derived from the textual content is included within the plurality of statement elements.

13. The method of claim 3, wherein constructing the logical argument object for a first argument comprises performing an automatic analysis of the corresponding statement data objects for the plurality of statement elements syntactically and semantically according to a natural language model defined for the specified argument type to identify a plurality of logical relationships between the underlying propositions represented by the statement elements, and constructing a logical structure of the first argument by defining the plurality of interconnections of the first argument and the one or more premises, the one or more warrants, and the first claim of the first argument according to the identified plurality of logical relationships, and wherein the first set of input according to which the logical argument object for the first argument is constructed is provided based on the logical structure of the first argument.

14. The method of claim 1, wherein the user interface is provided as a graphical user interface (GUI) via which each of the plurality of statement elements is accessible by the one or more users, further comprising providing an argument construction window within the GUI that provides a set of interface elements allowing the one or more users to visually construct a logical structure of the first argument by accessing the plurality of statement elements and interconnecting a set of the plurality of statement elements in the argument construction window according to the specified argument type, wherein the first set of input according to which the logical argument object for the first argument is constructed is provided based on construction of the logical structure of the first argument by the one or more users within the argument construction window, and wherein the structured argument model representation of the logical argument object is generated and displayed in conjunction with the logical structure of the first argument constructed by the one or more users within the argument construction window.

15. The method of claim 14, wherein each of the plurality of statement elements is represented within the user interface based on a corresponding statement data object stored for the statement element, wherein at least some of the plurality of statement elements for which the statement type is premise or claim are represented and accessible by the one or more users via a first sub-window of the argument construction window, wherein the set of interface elements of the GUI allows the one or more users to access a set of warrant types that is predetermined based on the specified argument type and define at least one warrant of the first argument by selecting any of the warrant types and designating a location within the logical structure of the first argument for interconnecting the selected warrant type in the argument construction window according to a logical specification for the selected warrant type, and further comprising constructing and storing the corresponding statement data object for the statement element for each warrant defined by the one or more users within the argument construction window.

16. The method of claim 14, wherein the set of interface elements provided by the GUI allows the one or more users to select any of the statement elements included in the first argument within the structured argument model representation of the logical argument object for the first argument displayed within the argument construction window for which the statement type is premise or warrant, designate the selected statement element as a sub-claim of a sub-argument within the first argument, and provide a second set of input to define the sub-argument by visually constructing a logical structure of the sub-argument within the argument construction window according to the specified argument type to include one or more premises and one or more warrants of the plurality of statement elements, the sub-claim, and a plurality of interconnections defining logical relations between the one or more premises, the one or more warrants, and the sub-claim according to respective logical rules for the one or more warrants such that the respective associated state of the sub-claim is dependent upon the respective associated states of the one or more premises and the one or more warrants and the logical relations defined by the interconnections of the sub-argument.

17. The method of claim 16, further comprising constructing a logical argument object for the sub-argument based on the logical structure of the sub-argument constructed by the one or more users within the argument construction window, updating the logical argument object for the first argument to include the logical argument object for the sub-argument in association with the selected statement element designated as the sub-claim, automatically analyzing the logical argument object for the sub-argument to determine the respective associated state of the sub-claim based on the respective associated states of the one or more premises and the one or more warrants and the logical relations defined by the interconnections in the sub-argument, and automatically analyzing the logical argument object for the first argument to update the respective associated state of any of the one or more premises, the one or more warrants, and the first claim that is dependent upon the respective associated state of the selected statement element designated as the sub-claim in accordance with any change in the respective associated state of the selected statement element designated as the sub-claim.

18. The method of claim 17, further comprising updating the structured argument model representation of the logical argument object for the first argument displayed within the argument construction window to update the indication of the respective associated state of any of the one or more premises, the one or more warrants, and the first claim that is changed based on any change in the respective associated state of the selected statement element designated as the sub-claim, updating the indication of the selected statement element designated as the sub-claim to include an interface element indicating the sub-argument, and expanding the structured argument model representation of the logical argument object for the first argument displayed within the argument construction window to include a structured argument model representation of the logical argument object for the sub-argument in response to a predefined user interaction with the interface element indicating the sub-argument via the GUI.

19. The method of claim 2, wherein the corresponding statement data object for each of the plurality of statement elements and the logical argument object for the first argument are maintained as persistent objects by a collaborative environment application executing within a distributed data processing system, wherein the collaborative environment application maintains the on-line collaborative environment and is accessible to a plurality of users through the user interface provided via the one or more clients systems communicatively connected by a network whereby the plurality of users simultaneously and continuously perceive and interact with the corresponding statement data object for each of the plurality of statement elements and the logical argument object for the first argument through interface elements provided in conjunction with representations of the statement elements and the structured argument model representation within the user interface.

20. The method of claim 19, wherein the user interface is provided as a GUI via which the structured argument model representation for the first argument is displayed and accessible by the plurality of users within an argument construction window of the GUI, wherein the interface elements provided within the user interface allow the plurality of users to simultaneously and continuously modify the first argument by accessing the interface elements to visually modify structure and contents of the first argument by adding to, removing from, moving, or modifying the one or more premises, the one or more warrants, the first claim, the interconnections between the one or more premises, the one or more warrants, and the first claim, and the respective associated state of each of the one or more premises, the one or more warrants, and the first claim within the structured argument model representation for the first argument.

21. The method of claim 20, wherein the collaborative environment application is configured to, in response to and based on each modification of the first argument by the plurality of users via the user interface, dynamically update the logical argument object for the first argument, reanalyze the logical argument object for the first argument to determine the respective associated states of the one or more premises, the one or more warrants, and the first claim of the first argument and update the associated state fields of the corresponding statement data objects according to any changes in the respective associated states, and update the structured argument model representation of the logical argument object for the first argument displayed within the argument construction window.

22. The method of claim 21, wherein the logical argument object for the first argument is one of a plurality of logical argument objects for a plurality of arguments maintained as persistent objects by the collaborative environment application, wherein a corresponding set of propositional content is available for each of the arguments as a corresponding plurality of statement elements that each have a respective associated state and are based on a corresponding set of corresponding statement data objects maintained as persistent objects by the collaborative environment application in association with the logical argument object for the argument, wherein each of the plurality of arguments is defined according to a specified argument type to include one or more premises and one or more warrants of the corresponding statement elements for the argument, at least one claim of the corresponding statement elements for the argument, and a corresponding plurality of interconnections defining logical relations between the one or more premises, the one or more warrants, and the at least one claim according to respective logical rules for the one or more warrants such that the respective associated state of each claim is dependent upon the respective associated states of the one or more premises and the one or more warrants and the logical relations defined by the interconnections of the argument, and wherein the collaborative environment application is configured to automatically analyze the logical argument object for each argument to determine the respective associated state of each claim of the argument based on the respective associated states of the one or more premises and the one or more warrants and the logical relations defined by the interconnections in the argument.

23. The method of claim 22, wherein each of the plurality of arguments is accessible to the plurality of users through the user interface provided via the one or more clients systems, and wherein, upon any argument being accessed by at least one user through the user interface provided via at least one client system, the collaborative environment application is configured to represent the corresponding plurality of statement elements available for the argument within the user interface at the least one client system, generate a corresponding structured argument model representation of the logical argument object for the first argument within the user interface that includes an indication of each of the one or more premises, the one or more warrants, the at least one claim, the interconnections between the one or more premises, the one or more warrants, and the at least one claim of the argument, and the respective associated state of each of the one or more premises, the one or more warrants, and the at least one claim of the argument, and allow the at least one user to simultaneously and continuously perceive and interact with the corresponding statement data object for each of the corresponding plurality of statement elements and the logical argument object for the argument through the interface elements provided in conjunction with representations of the corresponding statement elements and the structured argument model representation within the user interface provided via at least one client system.

24. The method of claim 23, wherein the collaborative environment application maintains a user account object for each of the plurality of users that includes information related to the user, and wherein each user account object, the logical argument object for each argument, and the corresponding set of corresponding statement data objects for the statement elements available for each argument are stored in and accessed by the collaborative environment application from one or more data stores within the distributed processing system.

25. The method of claim 24, wherein the user account object for each user includes a plurality of data fields maintained by the collaborative environment application for tracking a corresponding set of rights pertaining to functionality available to the user to perceive and interact with each of the arguments and each of the corresponding data objects for each argument, a history record of interactions by the user with each of the arguments and each of the corresponding data objects for each argument, and statistics pertaining to the history record of interactions by the user, statement elements for which corresponding statement data objects are constructed by the collaborative environment application based on input provided by the user, and modifications to arguments and statement elements performed by the via the user interface.

26. The method of claim 25, wherein the corresponding set of rights of the user account object for each user is maintained by the collaborative environment application based on other information maintained within the user account object for the user.

27. The method of claim 24, wherein the logical argument object for each argument includes a plurality of data fields maintained by the collaborative environment application for tracking user access rights to the argument, a history record of user interactions with and modifications to the argument, and statistics pertaining to the history record for the argument, wherein the collaborative environment application is configured to restore the logical argument object for each argument based on the history record maintained within the logical argument object, wherein the plurality of data fields of the corresponding statement data object for each statement element available for each argument includes data fields maintained by the collaborative environment application for tracking user access rights to the statement element, a history record of user interactions with and modifications to the statement element, and statistics pertaining to the history record for the statement element, and wherein the collaborative environment application is configured to restore the corresponding statement data object for each statement element based on the history record maintained within the statement data object.

28. The method of claim 24, wherein a persistent feedback object for each user account object, the logical argument object for each argument, and the corresponding statement data object for each statement element available for each argument is maintained in and accessed by the collaborative environment application from the one or more data stores within the distributed processing system, wherein the persistent feedback object for the user account object for each user defines functionalities that are available to the plurality of users for rating and engaging in various types of computer-mediated communication with the user and accessible to the plurality of users through the user interface provided via the one or more clients systems, wherein the persistent feedback object for the logical argument object for each argument defines functionalities that are available to the plurality of users for rating and engaging in various types of computer-mediated communication related to the argument and accessible to the plurality of users through the user interface provided via the one or more clients systems when the structured argument model representation for the argument is displayed within the argument construction window, and wherein the persistent feedback object for the corresponding statement data object for each statement element available for each argument defines functionalities that are available to the plurality of users for rating and engaging in various types of computer-mediated communication related to the statement and accessible to the plurality of users through the user interface provided via the one or more clients systems when the structured argument model representation for the argument is displayed within the argument construction window.

29. The method of claim 19, wherein, if the specified argument type is a game type, the collaborative environment application is accessible to a plurality of users through the user interface provided via the one or more clients systems communicatively connected by a network and configured to allow one or more of the users to simultaneously and continuously perceive and interact with the corresponding statement data object for each of the plurality of statement elements and the logical argument object for the first argument through the interface elements provided in conjunction with representations of the statement elements and the structured argument model representation within the user interface according to a set of rules for the game type, and wherein the collaborative environment application is configured to maintain a respective score for each of one or more of the users based on user interactions performed for the first argument through the interface elements according to the set of rules and to generate a representation of the respective score for each of one or more of the users within the user interface.

30. The method of claim 1, wherein, if the specified argument type is a multiple-argument type, the first argument is one of a plurality of arguments for which the logical argument object is constructed with each of the arguments being defined to correspondingly include one or more premises and one or more warrants of the statement elements, a respective claim of the statement elements, and a plurality of interconnections defining logical relations between the one or more premises, the one or more warrants, and the respective claim according to respective logical rules for the one or more warrants such that the respective associated state of the respective claim is dependent upon the respective associated states of the one or more premises and the one or more warrants and the logical relations defined by the interconnections of the argument, and wherein the structured argument model representation of the logical argument object is generated to include indications of the one or more premises, the one or more warrants, the respective claim, the interconnections between the one or more premises, the one or more warrants, and the respective claim, and the respective associated states of the one or more premises, the one or more warrants, and the respective claim for each argument.

* * * * *